(12) United States Patent
Maeda et al.

(10) Patent No.: US 8,194,277 B2
(45) Date of Patent: Jun. 5, 2012

(54) IMAGE COMBINING APPARATUS, AND CONTROL METHOD AND PROGRAM THEREFOR

(75) Inventors: Masao Maeda, Kawasaki (JP); Seiya Fujinaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 946 days.

(21) Appl. No.: 11/448,869

(22) Filed: Jun. 8, 2006

(65) Prior Publication Data

US 2006/0291000 A1  Dec. 28, 2006

(30) Foreign Application Priority Data

Jun. 20, 2005  (JP) .................................. 2005-179627
Jun. 24, 2005  (JP) .................................. 2005-185261

(51) Int. Cl.
*G06K 15/00* (2006.01)

(52) U.S. Cl. ........ 358/1.18; 358/452; 358/448; 358/1.1; 382/181; 382/186; 235/454; 235/487

(58) Field of Classification Search .................. 358/452, 358/448, 400, 1.18; 382/181, 186; 235/454, 235/487
See application file for complete search history.

(56) References Cited

U.S. PATENT DOCUMENTS

| | | | |
|---|---|---|---|
| 5,841,898 A | 11/1998 | Liguori | .......................... 382/164 |
| 5,956,044 A | 9/1999 | Giorgianni et al. | |
| 6,005,972 A * | 12/1999 | Fredlund et al. | .............. 382/176 |
| 6,298,154 B1 | 10/2001 | Cok | .............................. 382/186 |
| 6,492,994 B2 | 12/2002 | Yokouchi | |
| 6,519,046 B1 | 2/2003 | Kinjo | |
| 6,525,836 B1 | 2/2003 | Ito et al. | |
| 6,594,403 B1 | 7/2003 | Bozdagi et al. | |
| 6,856,422 B1 | 2/2005 | Higashibata et al. | |
| 6,907,131 B2 * | 6/2005 | Verhoeven et al. | ........... 382/100 |
| 6,995,862 B1 | 2/2006 | Murata et al. | |
| 7,092,116 B2 | 8/2006 | Calaway | |
| 7,154,627 B2 | 12/2006 | Nishikawa et al. | |
| 7,265,851 B2 | 9/2007 | Kinjo | |
| 7,307,749 B2 | 12/2007 | Nishikawa et al. | |
| 7,317,563 B2 | 1/2008 | Kinjo | |
| 2002/0054331 A1 * | 5/2002 | Takenobu et al. | ............ 358/1.15 |
| 2002/0141005 A1 | 10/2002 | Okisu et al. | |
| 2003/0063295 A1 | 4/2003 | Kinjo | |
| 2003/0067631 A1 | 4/2003 | Kinjo | |
| 2003/0179409 A1 | 9/2003 | Nishida | |
| 2003/0231354 A1 | 12/2003 | Shinoda et al. | |
| 2004/0095606 A1 | 5/2004 | Walmsley et al. | |
| 2004/0095607 A1 | 5/2004 | Walmsley et al. | |
| 2004/0095608 A1 | 5/2004 | Walmsley et al. | |
| 2004/0145770 A1 * | 7/2004 | Nakano et al. | ................ 358/1.15 |
| 2004/0190059 A1 | 9/2004 | Winter et al. | |
| 2004/0246507 A1 | 12/2004 | Hattori | |
| 2005/0078867 A1 * | 4/2005 | Kanno | .......................... 382/163 |

(Continued)

FOREIGN PATENT DOCUMENTS

JP  63-40933  2/1988

(Continued)

*Primary Examiner* — Mark K Zimmerman
*Assistant Examiner* — Martin Mushambo
(74) *Attorney, Agent, or Firm* — Fitzpatrick, Cella, Harper & Scinto

(57) ABSTRACT

In combining a handwritten image with an arbitrary image in an image processing apparatus, a sheet is prepared so as to allow confirmation of a positional relationship of the arbitrary image and the handwritten image.

15 Claims, 17 Drawing Sheets

U.S. PATENT DOCUMENTS

| | | |
|---|---|---|
| 2005/0185204 A1 | 8/2005 | Shelton et al. |
| 2005/0213174 A1 | 9/2005 | Maki et al. |
| 2006/0158706 A1 | 7/2006 | Mori et al. |

FOREIGN PATENT DOCUMENTS

| | | |
|---|---|---|
| JP | 03-097369 | 4/1991 |
| JP | 5-122496 | 5/1993 |
| JP | 06-044265 | 2/1994 |
| JP | 08-287238 | 11/1996 |
| JP | 09-091284 A | 4/1997 |
| JP | 9-139832 | 5/1997 |
| JP | 10-016453 | 1/1998 |
| JP | 10-162159 | 6/1998 |
| JP | 10-260482 A | 9/1998 |
| JP | 10-294854 | 11/1998 |
| JP | 2002-051283 | 2/2002 |
| JP | 2003-060885 | 2/2003 |
| JP | 2003-080789 | 3/2003 |
| JP | 2005-074724 A | 3/2005 |
| WO | 97-04586 A1 | 2/1997 |

* cited by examiner

US 8,194,277 B2

IMAGE COMBINING APPARATUS, AND CONTROL METHOD AND PROGRAM THEREFOR

BACKGROUND OF THE INVENTION

1. Field of the Invention

The present invention relates to an image combining apparatus for combining photographic image data entered from image input means, and data read from a handwritten original (manuscript).

2. Related Background Art

Along with the recent pervasiveness and the technical advances in photographic image input apparatuses such as a digital camera and a color scanner, and in image output apparatus such as a color printer, various methods of use are being proposed on digital photo images.

Such images are not only captured and printed on a printing medium, but are often utilized with various processing and editing in various manners. For example it is proposed to send a photograph with an inscribed message as a letter, and also to paste a photograph with an inscribed title or illustration to an album.

For adding a handwritten message or illustration to a photo image entered from an image input apparatus, Japanese Patent Application Laid-open No. S63-040933 discloses a method of displaying the input photo image on a display apparatus such as a liquid crystal panel, and inputting a handwritten image through a touch-panel input apparatus provided in the display apparatus, thereby combining the photo image and the handwritten image.

Also Japanese Patent Application Laid-open No. H09-139832 discloses a method in which a handwritten original, written on a paper sheet different from an input photo image, is read by a reading apparatus and is combined with the photo image.

Also the printing apparatus is increasingly provided, not only a printing function, with complex functions such as an image reading function and a memory card slot for accepting a memory card, and Japanese Patent Application Laid-open No. H05-122496 discloses a method, in such printing apparatus, of combining and printing a photo image in a memory card and data read in a reading unit.

Also such image combining is not limited to a photo image data and a handwritten image, but the data superposed with the photo image also include a photo frame or a message of a predetermined pattern.

However, in the case of drawing a message or an illustration on a photo image, by selecting a background area other than a person recorded as a main object, the prior methods involve following limitations.

The touch-panel method mentioned above allows to draw a handwritten character or an illustration directly on a photo image while observing the photo image, but requires a display apparatus and a touch-panel input apparatus which lead to a high hardware cost, and an ability of expression is inevitably restricted as the image resolution of the handwritten input is limited by the resolution of the display apparatus or the touch panel.

On the other hand, the original reading method mentioned above has the advantages that a handwritten original can be prepared in a simple and easy manner and that various expressions are possible depending on the type of the writing utensil, but involves a drawback that, as the handwritten original is drawn on an original sheet separate from the photo image, a superposing positional relation of the handwritten image with the photo image cannot be confirmed exactly at the preparation of the handwritten original.

Also with an increase in the data to be combined, such as photo image data, data handwritten by the user, a photo frame etc., the combining has to be executed plural times on the data of plural contents, thereby resulting in a large burden on the resources used for the combining and also in a long process time.

Also at the image combining operation, it is not possible to know how the content to be combined and the content written by the user are positioned after the image combining.

SUMMARY OF THE INVENTION

An object of the present invention is to provide an image combining apparatus which allows to draw a handwritten original, while confirming, at the drawing operation of the handwritten original on a sheet, a positional relationship how the handwritten original is to be combined with respect to an object photo image, and a control method and a program therefor.

Another object of the present invention is to provide an image combining apparatus that does not involve a large burden on resources required for image combining nor a long process time, even with a large amount of data to be combined such as photo image data, data written by a user, a photo frame etc., and an image processing method and a program therefor.

BRIEF DESCRIPTION OF THE DRAWING

FIGS. 10-1 and 10-2 are views showing a configuration of an original sheet SH4 to be inscribed by the user in an embodiment 6 of the present invention;

FIGS. 11-1 and 11-2 are views showing operations showing a photo image PI selection and a font/illustration selection (combination print image 52) for printing the original sheet SH4;

FIGS. 16-1 and 16-2 are views showing a configuration of an original sheet SH5 in an embodiment 7 of the present invention;

FIGS. 18-1 and 18-2 are views showing, in an embodiment 8, an original sheet SH6, bearing a printed image 52 for combining, corresponding to the font/illustration FI, as a reference image 41.

DETAILED DESCRIPTION OF THE PREFERRED EMBODIMENTS

Figure 1:
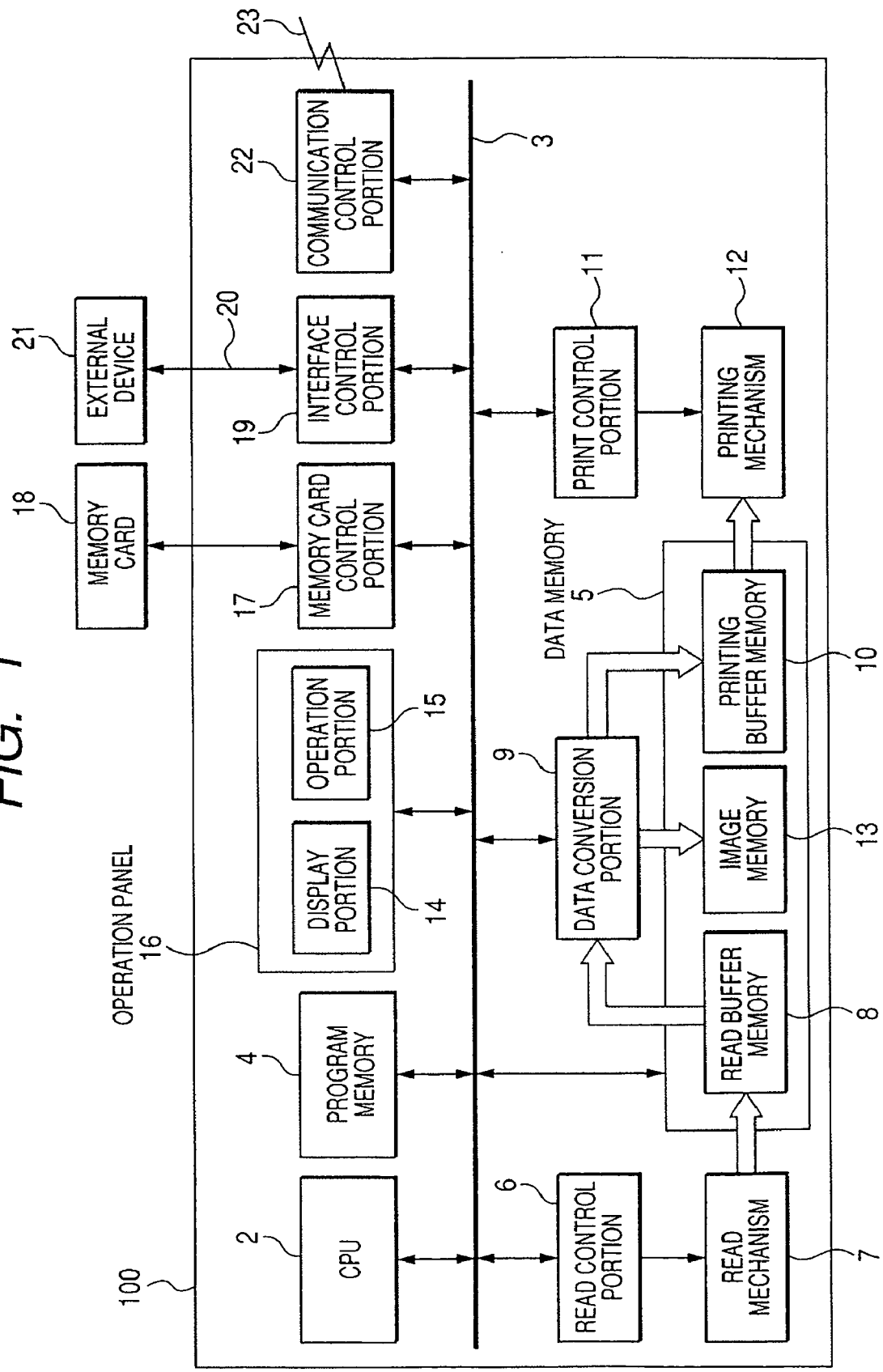
FIG. 1 is a block diagram of an image combining apparatus 100 constituting an embodiment 1 of the present invention.

FIG. 1 is a block diagram showing an image combining apparatus 100 constituting an embodiment 1 of the present invention.

The image combining apparatus 100 is provided with a CPU 2, an internal bus 3, a program memory 4, a data memory 5, a read control portion 6, a read mechanism 7, a data conversion portion 9, a print control portion 11, a print mechanism 12, an operation panel 16, a memory card control portion 17, an interface control portion 19, an interface 20 and a communication control portion 22.

The data memory 5 includes a read buffer memory 8, a print buffer memory 10, and an image memory 13. The operation panel 16 includes a display portion 14 and an operation portion 15.

The CPU 2 is constructed as a microprocessor, which functions according to a control program, stored in the program memory 4, constituted of a ROM and connected through the internal bus 3, and to a content of the data memory constituted of a RAM. The CPU 2 operates the read mechanism 7 through the read control portion 6, and stores original image data, read by an unillustrated image sensor provided in the read mechanism 7, in the read buffer memory 8 provided in the data memory 5.

The original image data, stored in the read buffer memory 8, are read by the data conversion portion 9 for conversion into print data, which are stored in the print buffer memory 10 provided in the data memory 5.

The data conversion portion 9 executes image data converting operations, such as an analysis of page description language (PDL) and a CG (computer graphics) development of character data.

The CPU 2 operates the print mechanism 12 through the print control portion 11, and also reads the print data stored in the print buffer memory 10 for supply to the print mechanism 12, and executes a printing operation on a print medium, thereby executing a copying operation.

The data memory 5 is provided with the image memory 13, which temporarily stores various image data, in addition to the original image data read by the read mechanism 7, and executes an editing thereon. Also the image data stored in the image memory 13 are converted by the data conversion portion 9 into print data for printing, whereby a printing operation of a photo image and the like can be realized in addition to the copying operation.

The read buffer memory 8, the print buffer memory 10 and the image memory 13, provided in the data memory 5, are managed by the CPU 2, and capacities of these memories are dynamically changed and assigned according to the operation status such as an operation mode and a setting by the user.

The operation panel 16 is equipped with numeral input keys, character input keys, one-touch telephone number keys, mode setting keys, a determination key, a cancel key etc., and is constituted of an operation part to be used by the user for selecting a destination of image transmission and for registering various registration data or an energy saving mode, various keys, LED (light-emitting diodes) and an LCD (liquid crystal display), thus being utilized for various input operations by the user and for displaying operation statuses of the image combining apparatus 100.

The memory card control portion 17 controls an access to a memory card 18 serving as a data memory medium, and reads and writes the image data and the like stored in the memory card 18. Thus the photo image data, stored in the memory card 18, are read, then stored in the image memory 13, further converted into print data and printed.

The interface control part 19 controls a communication process by the interface 20, thereby executing data exchanges with an external apparatus 21.

As the external apparatus 21, a personal computer may be connected for receiving print data, prepared by a printer driver functioning on the computer, and printing such print data. Also a digital camera or the like may be connected for reading photo image data, for storage in the image memory 13 and conversion into print data for printing.

The communication control portion 22, including a MODEM (modulation-demodulation unit) and an NCU (network control unit), is connected to an analog communication line 23 and executes a communication control and a line control such as a call making or a call reception.

Figure 9:
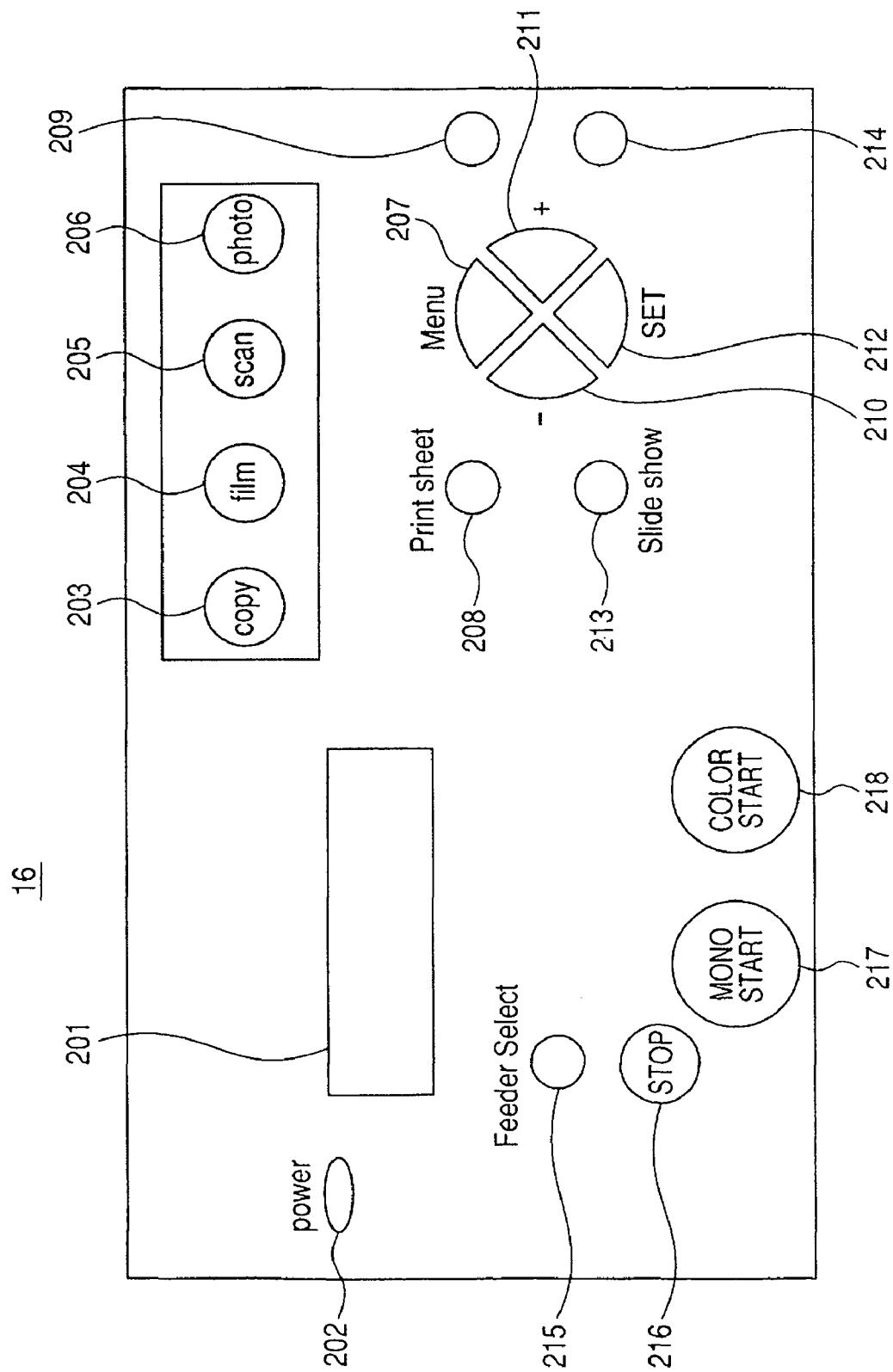
FIG. 9 is a view showing a specific example of an operation panel 16 in the image combining apparatus 100.

Now reference is made to FIG. 9, showing details of the operation panel 16 shown in FIG. 1. The operation panel 16 is equipped with an LCD display 201, a power key 202, a copy mode key 203, a film mode key 204, a scan mode key 205, a photo mode key 206, a menu key 207, a print sheet key 208, a scan sheet key 209, a minus key 210, a plus key 211, a set key 212, a slide show key 213, a sheet setting key 214, a feeder selection key 215, a stop key 216, a monochromatic start key 217, and a color start key 218.

The LCD display 201 is used for displaying various information such as a message and an operation prompt.

The power key 202 is used for turning on/off the power supply of the image processing apparatus 100.

The copy mode key 203 is used for setting the image processing apparatus 100 in a state capable of a copying operation, and the image processing apparatus 100 is shifted to a copy mode when the copy mode key 203 is depressed.

The film mode key 204 is used for setting the image processing apparatus 100 in a state capable of a printing operation from a film, and the image processing apparatus 100 is shifted to a film mode when the film mode key 204 is depressed.

The scan mode key 205 is used for setting the image processing apparatus 100 in a state capable of a scanning operation, and the image processing apparatus 100 is shifted to a scan mode when the scan mode key 205 is depressed.

The photo mode key 206 is used for setting the image processing apparatus 100 in a state capable of a direct printing operation by a signal from a digital photo card or a digital camera, and the image processing apparatus 100 is shifted to a photo mode when the photo mode key 206 is depressed.

The menu key 207 is used for displaying set items for example in executing a copying operation, a facsimile operation or a direct printing from a card. A depression of the menu key 207 causes a display of the set items for execution on the LCD 201, and such set items may be selected by the plus key 211 and the minus key 210 and set by the set key 212.

Figure 3:
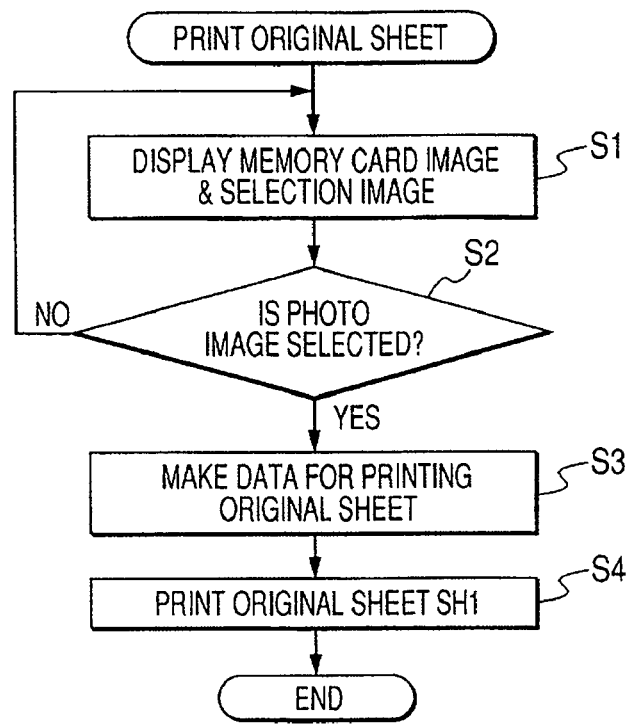
FIG. 3 is a flow chart showing, in the embodiment 1, a process executed by a CPU 2 of the image combining apparatus 100 for printing the original sheet SH1.

The print sheet key 208 is used for printing an original sheet SH1 as shown in FIG. 3.

The scan sheet key 209 is used for reading the sheet SH1. In the image processing apparatus 100, information written on the sheet, printed by the print sheet key 208, is read by the read portion 107 for job execution, and the scan sheet key 209 is used for instructing such sheet reading.

The minus key 210 and the plus key 211 are used by the user for making a selection from plural candidates in the menu or in a user registration. "Plus" and "minus" respectively indicate a forward shift and a backward shift. The set key 212 is used for determining a selected item. The slide show key 213 is used for displaying images of the memory card MC in succession on the display of the operation panel 16.

The sheet setting key 214 is depressed for a sheet setting in the copying or other printing operation. The feeder selection key 215 is used, in case a sheet feeding portion 114 has plural sheet feeder portions, for switching such sheet feeder.

The stop key 216 is used for terminating an operation such as a facsimile transmission-reception, a copying operation or other operations. The monochromatic start key 217 is used for starting a monochromatic facsimile transmission or a monochromatic copying. The color start key 218 is used for starting a color facsimile transmission or a color photo printing.

Figure 2:
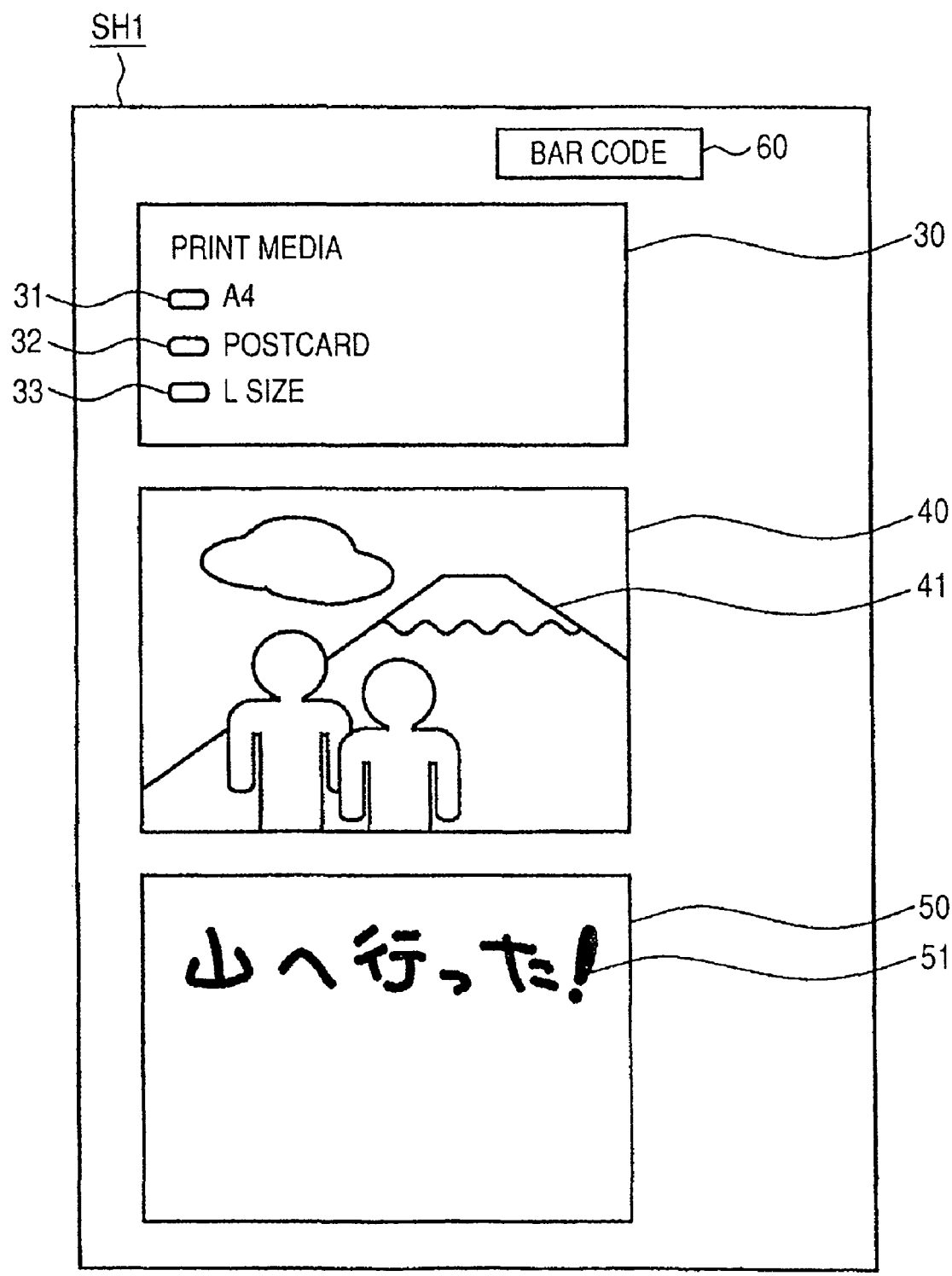
FIG. 2 is a view showing an original sheet SH1 in the embodiment 1.

FIG. 2 shows an original sheet SH1 in the embodiment 1.

The original sheet SH1 is used in case of synthesizing a handwritten image with a photo image serving as a reference image, and includes a setting area 30, a reference image area 40, a handwriting area 50, and a bar code 60.

The setting area 30 is provided, for selecting a size of the print medium, a mark 31 for selecting an A4 size, a mark 32 for selecting a postcard, and a mark 33 for selecting an L-size. The user blacks out one of the mark 31 for selecting the A4 size, the mark 32 for selecting the postcard, and the mark 33 for selecting the L-size, thereby selecting a size of the print medium to be used for printing the combined result.

The reference image area 40 prints a reference image 41. The "reference image" corresponds to a photo image selected by the user, and it is not the photo image itself but is printed from such photo image.

The handwriting area 50 is an area where the user writes a handwritten image 51 to be combined with the reference image 41.

The reference image area 40 and the handwriting area 50 have substantially same sizes and substantially same shape, and the handwriting area 50 is provided close to the reference image area 40.

The read control portion 6, the read mechanism 7, the data memory 5, the print control portion 11, and the print mechanism 12 constitute an example of original sheet print means for printing the original sheet SH1.

As shown in FIG. 2, under the reference image area 40 bearing the reference image 41, the handwriting area 50 of a same size as the reference image 41 is provided and the user can draw the handwritten image 51 by an arbitrary writing utensil in the handwriting area 50.

The bar code 60 is used for specifying an image stored in the memory card 18, and is for example a file name of the image stored in the memory card 18.

In the following, there will be explained a process of the embodiment 1, in which the CPU 2 of the image combining apparatus 100 prints the original sheet SH1.

FIG. 3 is a flow chart showing a process of the embodiment 1, in which the CPU 2 of the image combining apparatus 100 prints the original sheet SH1.

The process shown in FIG. 3 is executed when the user selects "original sheet printing" in the menu displayed on the operation panel 16.

At first, a step S1 reads a photo image data file in the memory card 18 and displays it on the display portion 14. A step S2 monitors a key operation on the operation portion 15 and discriminates whether a photo image is selected. In case a photo image is selected, a step S3 reads the selected photo image (reference image 41) from the memory card 18, and combines it with print data, stored in advance in the program memory 4 for printing in the setting area 30, thereby preparing print data for the original sheet SH1.

A step S4 control the print mechanism 12 based on thus prepared print data, thereby printing the original sheet SH1.

In the following, there will be explained an operation of the embodiment 1 for reading the original sheet SH1 bearing the handwritten image and printing the reference image 41 and the handwritten image 51 in a combined image.

Figure 4:
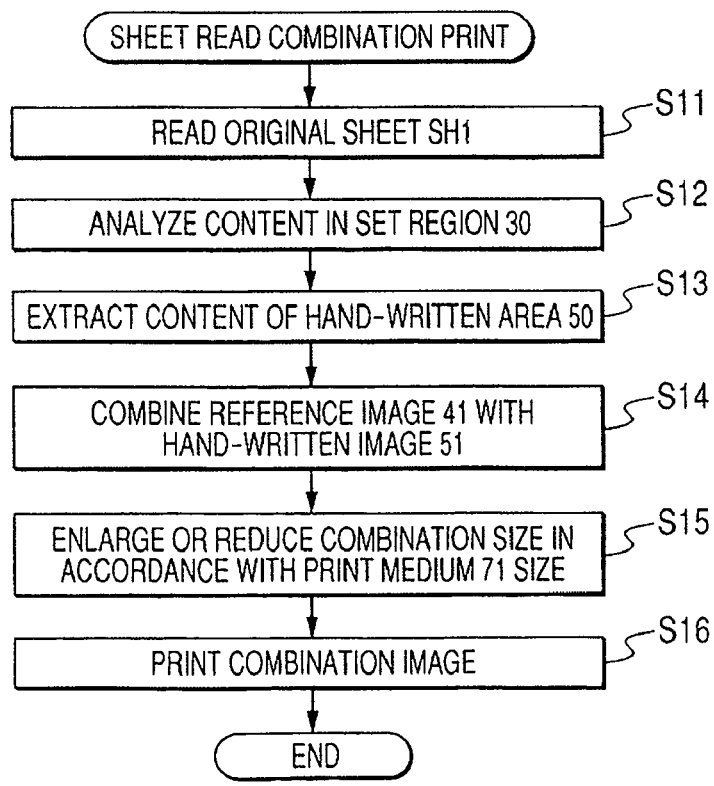
FIG. 4 is a flow chart showing, in the embodiment 1, a process executed by the CPU 2 in reading the original sheet SH1 bearing a handwritten image and combining and printing a reference image 41 and a handwritten image 51.

FIG. 4 is a flow chart showing the functions of the CPU 2 in the embodiment 1, in case of reading the original sheet SH1 bearing the handwritten image and printing the reference image 41 and the handwritten image 51 in a combined image.

The process shown in FIG. 4 is executed when the user selects "original sheet reading and combined printing" in the menu displayed on the operation panel 16.

At first a step S11 controls the read mechanism 7 thereby reading the original sheet SH1. A step S12 extracts, from the image data of the read original sheet SH1, data of the setting area 30 and analyzes a marked state of the marks 31, 32 and 33 in the setting area 30, thereby acquiring information on the size of the selected print medium.

A step S13 extracts, from the image data of the read original sheet SH1, an image of the handwriting area 50 as handwritten image data. The extraction of the handwriting area 50 is executed for example by detecting a frame line indicating the handwriting area 50 of the original sheet SH1 in the reading operation, and by extracting the data within such detected frame line.

A step S14 analyzes the bar code 60 on the read original sheet SH1, and reads a photo image same as the photo image (reference image 41) selected by the user, from the memory card 18. The bar code 60 indicates, for example, a file name of the image stored in the memory card 18. The read image is combined with the handwritten image data, extracted in S13, to obtain combined image data.

A step S15 executes, based on the size selection information of print medium obtained in S12, a process of enlarging or reducing the combined image data, and controls the print mechanism 12 to print a combined image on an output print medium (S16).

Figure 5:
FIG. 5 is a view showing an example of a combined output 70 in the embodiment 1.

FIG. 5 shows an example of a combined output result 70 in the embodiment 1.

In the combined output result 70, as shown in FIG. 5, the reference image 41 and the handwritten image 51, inscribed in the handwriting area 50, are combined in a superposed manner, and enlarged or reduced so as to match the print medium size selected in the setting area 30, and thus enlarged or reduced combination data (combination result) are outputted on the print medium 71.

In the embodiment 1, the user can observe, in drawing the handwritten image 51 in the handwriting area 50 of the original sheet SH1, the reference image 41 provided in an adjacent position in a same size, and can therefore draw the handwritten image 51 while recognizing the positional relationship of the reference image 41 and the handwritten image 51 when both are combined in superposition.

In the embodiment 1, the reference image 41 and the handwriting area 50 are arrayed along a vertical direction on the original sheet SH1, but they may be arrayed in a lateral direction. In the embodiment 1, the reference image 41 and the handwriting area 50 are provided in a same size and in a mutually adjacent relation, but the reference image 41 and the handwriting area 50 need not necessarily be in a same size, as long as the positional relationship does not become very unclear.

Embodiment 2

Figure 6:
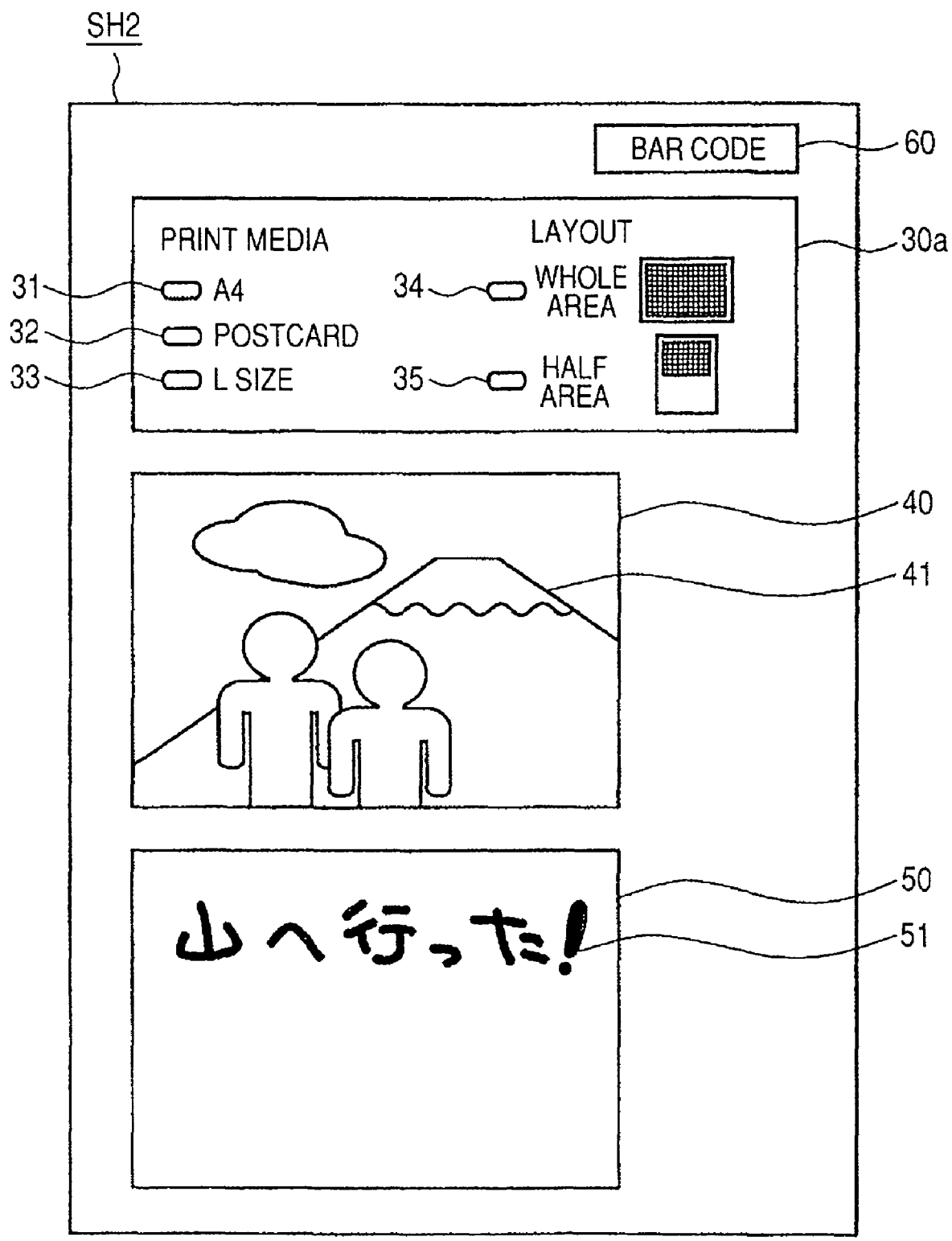
FIG. 6 is a view showing a configuration of an original sheet SH2 in an embodiment 2 of the present invention.

FIG. 6 shows a configuration of an original sheet SH2 in an embodiment 2 of the present invention.

The original sheet SH2 includes a setting area 30a, a reference image area 40, a handwriting area 50, and a bar code 60.

The setting area 30a is provided, for selecting a size of the print medium, a mark 31 for selecting an A4 size, a mark 32 for selecting a postcard, and a mark 33 for selecting an L-size, and for selecting a print layout, a mark 34 for selecting an entire area and a mark 35 for selecting a half area.

The user blacks out one of the mark 31 for selecting the A4 size, the mark 32 for selecting the postcard, and the mark 33 for selecting the L-size, thereby selecting a size of the print medium to be used for printing the combined result. Also, when the user blacks out the mark 34 for selecting the entire area (selecting an entire area layout), an image formed by superposing the reference image 41 and the handwritten image 51 is printed on the entire area of the print medium 71, while, when the user blacks out the mark 35 for selecting the half area (selecting a half-area layout), the reference image 41 is printed in a half area of the print medium 71 and the handwritten image 51 is printed on a remaining half area of the print medium 71.

Figure 7:
FIG. 7 is a view showing an example of a combined output in the embodiment 2, in case a half-area layout is selected by the user.

FIG. 7 shows an example of a combined output result when the user selects the half-area layout in the embodiment 2.

In such case, the reference image 41 and the handwritten image 51, drawn in the handwriting area 50, are combined side by side (that is, a mutually abutting combination of the photo image corresponding to the reference image and the handwritten image), then the combined image is enlarged or reduced according to the print medium size selected by the setting area 30a, and printed with the layout according to the designation by the user.

The combined output result, in case the user selects the entire-area layout, is same as the result 70 in the embodiment 1.

In the embodiment 2, the reference image 41 and the handwriting area 50 are positioned on the original sheet SH2 as shown in FIG. 6, and, when the entire-area layout is selected, the reference image 41 and the handwritten image 51 drawn in the handwriting area 50 are combined in a superposed manner, while, when the half-area layout is selected, the reference image 41 and the handwritten image 51 drawn in the handwriting area 50 are arrayed in the same positional relationship. There the user, in drawing the handwritten image 51 in the handwriting area 50 of the original sheet SH2, can easily recognize the result of combination with the reference image 41.

Also the embodiment 2 allows to achieve the entire-area layout and the half-area layout by a single original sheet SH2.

The embodiment 2 shows a case where the original photo image (reference image 41) is a laterally oblong so-called landscape image, but, in a case where the original photo image (reference image 41) is a vertically oblong so-called portrait image, the reference image 41 is printed in a laterally oblong position so that the user can conveniently understand the direction of the image.

Embodiment 3

Figure 8:
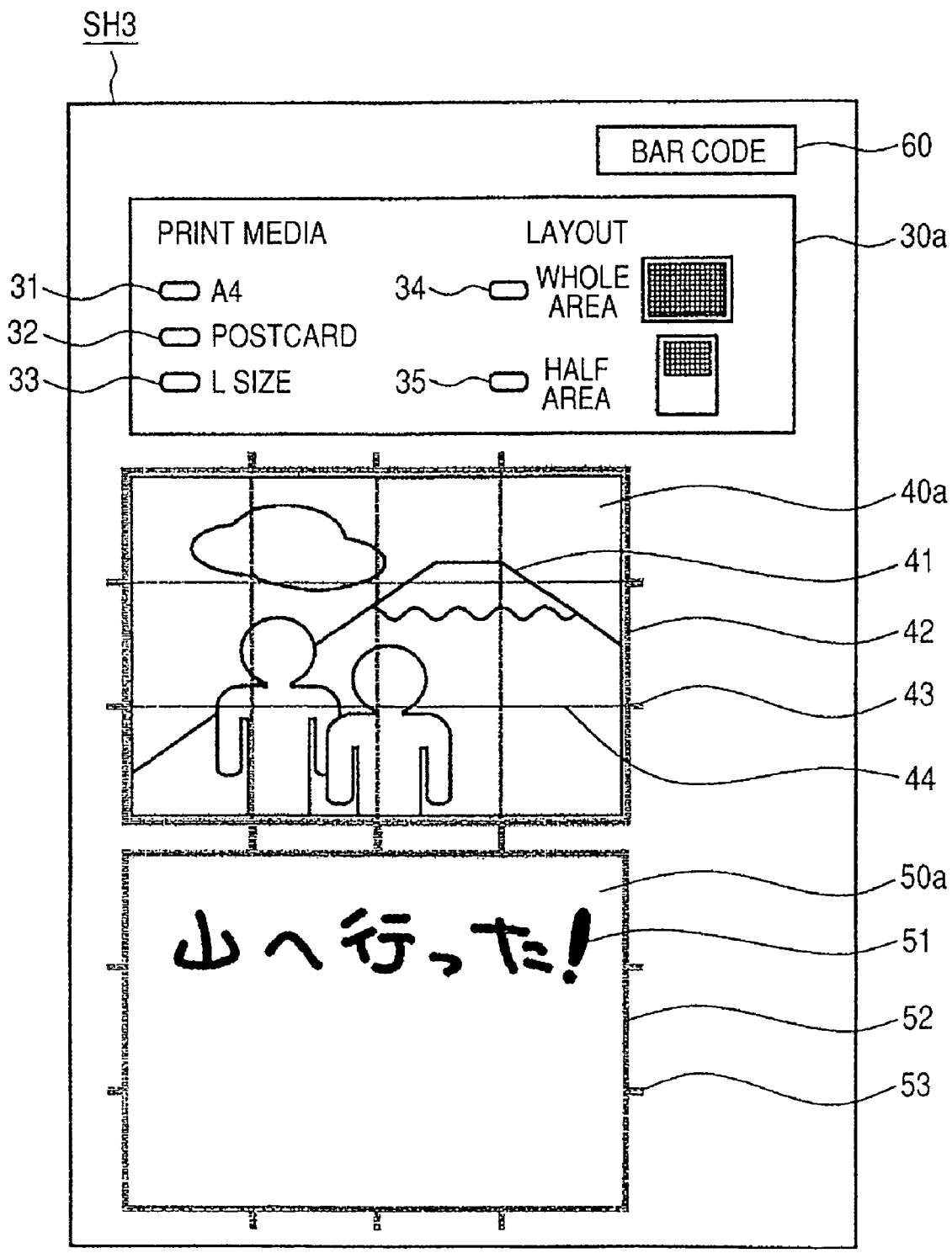
FIG. 8 is a view showing a configuration of an original sheet SH3 in an embodiment 3 of the present invention.

FIG. 8 shows a configuration of an original sheet SH3 in an embodiment 3 of the present invention.

The original sheet SH3 includes a setting area 30a, a reference image area 40a, a handwriting area 50a, and a bar code 60.

The setting area 30a is same as that shown in FIG. 6.

Then reference image area 40a prints a reference image 41, which is provided with a frame line 42, scale lines 43 and grid lines 44.

The frame line 42 surrounds the reference image area 40a. The scale lines 43 are provided to divide the vertical and horizontal lines of the frame line 42, and the grid lines 44 are provided to form a grid including the scale lines 43.

The handwriting area 50a is used by the user for drawing a handwritten image 51 and is provided with a frame line 52 and scale lines 53.

The frame line 52 surrounds the handwriting area 50a. The scale lines 53 are provided to divide the vertical and horizontal lines of the frame line 52.

The frame lines 42 and 52 have substantially same shapes, and the scale lines 43, 53 are provided in mutually approximately same positions of the frame lines.

The print mechanism 12 and the print control portion 11 constitute an example of the original sheet printing means, which serves to print the reference image frame line 42 on the reference image 41, also to print the handwriting area frame line 52 on the handwriting area 50, to print also the scale lines dividing the reference image frame line 42, and also to print the scale lines 53 in the positions, on the handwriting area frame line 52, substantially corresponding to those of the scale lines 43 on the reference image frame line 42.

The original sheet printing means also prints, on the reference image 41, the grid lines including the scale lines 43 on the reference image frame line 42.

In the embodiment 3, the frame lines, the scale lines and the grid lines are attached to the handwriting area 50 and the reference image 41 on the original sheet SH3, thereby further facilitating to understand the positional relationship at the image combining operation.

The embodiment 3 shows a case of adding all the frame lines 42, the scale lines 43 and the grid lines 44, but it is also possible to add the frame lines 42 and the scale lines 43 only.

Embodiment 4

In an embodiment 4 of the invention, in the printing of the original sheet in any one of the embodiments 1 to 3, the reference image 41 is printed with a lowered print density.

As the final output of the combined image utilizes the image read out from the memory card 18, while the reference image 41 printed on the original sheet is used only temporarily as a reference for the drawing of the handwritten image 51 by the user, so that the density of the reference image 41 is not reflected on the final output. Therefore, the reference image 41 may be printed with a lowered print density as long as it allows to confirm the mutual positional relationship of the handwritten image 51 and the reference image 41 at the image combining, and such lowered print density is effective in reducing an ink consumption in case an ink jet printing apparatus is employed as the print mechanism 12.

In outputting a combined result, the reference image to be printed in the reference area may be printed, instead of lowering the print density, with a smaller number of colors, or as a monochromatic image. Stated differently, upon outputting the combined result, printing may be made with an image quality different from that in the normal printing operation. Such "image quality" means parameters controlling the quality of an image, such as an ink density, a number of colors, a monochromatic or color, and an image resolution.

Embodiment 5

In an embodiment 5 of the present invention, in any of the embodiments 1 to 4, the photo image data are entered, instead of from the memory card 18, from the reading means, same as that used for reading the original.

The photo image data may also be obtained, instead of from the reading means used for reading the original, from an external equipment through the communication line 23 or through the interface 20.

It is also possible, in any one of the embodiments 1 to 4, to confirm the combined image result by displaying on a display portion of the operation panel 16, or to store the combined result in a memory medium such as the memory card 18, or to transfer the combined result to another equipment through the communication line 23 or through the interface 20. In this manner, the image after combining operation may be edited in such another equipment.

Embodiment 6

Figures 1, 10:
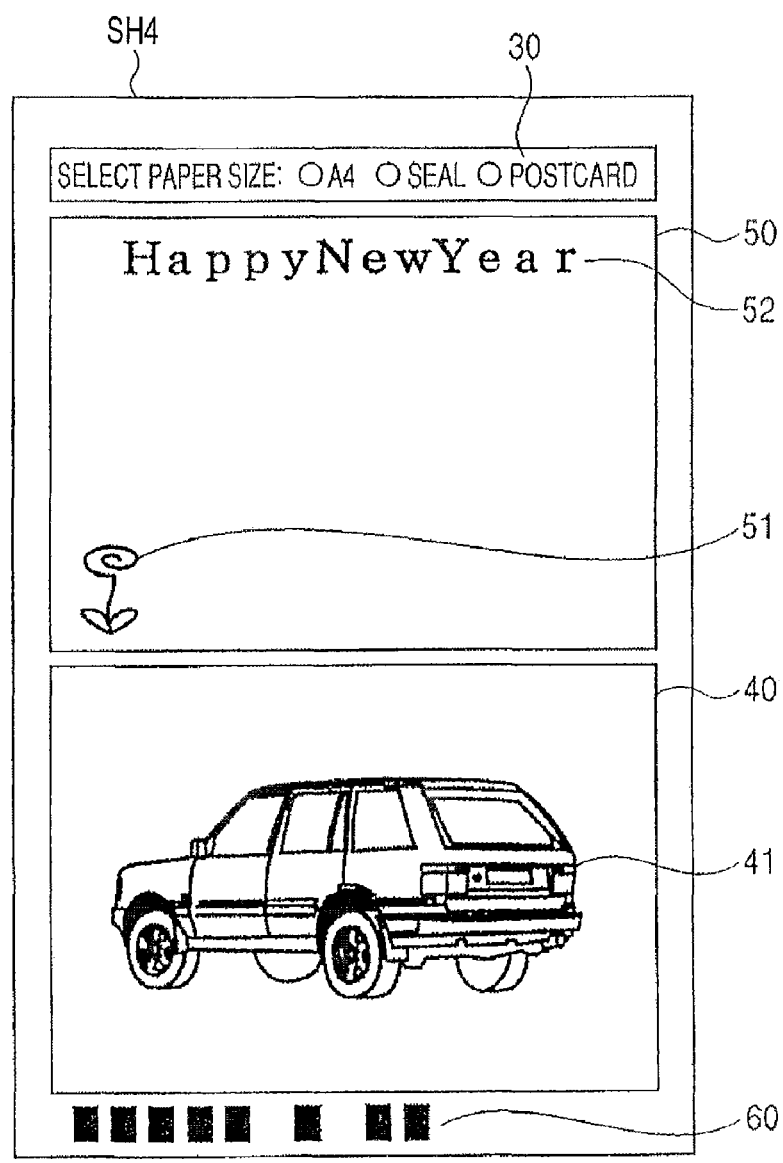
Figures 2, 10:

FIGS. 10-1 and 10-1 show an original sheet SH4 to be inscribed by the user in the embodiment 6.

More specifically, FIG. 10-1 shows an original sheet SH4 used in the embodiment 6, and FIG. 10-2 shows an example of the combined output 90 in the embodiment 6.

The original sheet SH4 includes a setting area 30, a reference image area 40, a handwriting area 50 and a bar code 60.

The original sheet SH4 is printed utilizing the operation panel 16 of the image processing apparatus 100, and a photo image, stored in the memory card MC connected to a USB host control portion 117, and a content inscribed in the original sheet SH4 are subjected to a combining process.

More specifically, at first a setting for printing the original sheet SH4 is executed in the image processing apparatus 100 through the operation panel 16, and the recording portion 113 executes a printing operation according to such setting. In such printing, the handwriting area 50 for inscribing a content for image synthesis is printed on the original sheet SH4, then the reading portion 107 reads such handwriting area 50 of the original sheet SH4 for synthesis with a photo image PI corresponding to the reference image 41, and the result of such synthesis is printed by the recording portion 113 to achieve an image combining process.

In the embodiment 6, the print sheet key 208 is depressed for printing the recording sheet SH4. In the following, details of the printing operation of the original sheet SH4 will be explained with reference to FIGS. 11-1 and 11-2, and details of the operations for reading the original sheet SH4 and executing the image combining will be explained with reference to FIG. 12.

The setting area 30 is used for designating a size of a sheet for printing the image combined by using the original sheet SH4. In the embodiment 6, such size designation is executed by a marking sheet, with printed marks corresponding to different sheet sizes. At the image combining operation, the reading portion 107 reads the setting area 30 while reading the original sheet SH4, and the output size of the combined image is determined according to the marked size in the setting area 30.

The reference image area 40 prints, as a sample, an image same as the photo image PI, and, in the image combining operation utilizing the original sheet SH4, data obtained by reading the image drawn in the handwriting area 50 and a photo image corresponding to the reference image 41 printed in the reference image area 40 are combined. The reference image 41 indicates an object image for combination, to be used as a reference when the user inscribes in the handwriting area 50, but the data for actual combining operation are not extracted from the original sheet SH4 but are obtained from the photo image stored in the digital camera DC.

The handwriting area 50 is used for inscribing a content, to be combined with a photo image PI, corresponding to the reference image 41 printed in the reference image area 40. An inscription is made in the handwriting area 50, and, when the reading portion 107 reads the original sheet SH4 at the image combining operation, a content inscribed in the handwriting area 50 is taken as a content for image combination. In the embodiment 6, at the image combining operation, a white background is disregarded, and a handwritten image 51 drawn by the user and a printed combining image 52 are regarded as a content of image combination and are used for the image combining operation. The handwriting area 50 and the reference image area 40 have mutually same sizes, so that the user can judge an actual size at the inscription in the handwriting area 50.

The combination print image 52 is an image of a font/illustration selected by the user at the printing of the original sheet SH4. The data for such image are present in the image processing apparatus 100 for printing the original sheet SH4, and, at the printing of the original sheet SH4, the frame of the handwriting area 50 and the image 52 for combination are printed in such a manner that the image 52 for combination is printed within the frame of the handwriting area 50 as shown in FIG. 10-1.

The "font" above indicates at least one of a character font, a style, a size, a color and a character decoration.

The handwritten image 51 shows an example of the content which the user actually draws on the original sheet SH4. The handwritten image 51 is absent at the printing of the original sheet SH4 and is later inscribed by the user in the handwriting area 50 after the original sheet SH4 is printed, and is thereafter combined with the photo image corresponding to the reference image 41.

In the image combining operation utilizing the original sheet SH4, the print image 52 and the handwritten image 51 in the handwriting area 50 are read as a single integral image and are combined with the photo image PI corresponding to the reference image 41 printed in the reference image area 40.

In the bar code 60 recorded on the original sheet SH4, embedded is information of the photo image corresponding to the reference image 41 (for example ID of the photo image). A photo image corresponding to the reference image 41 can be extracted by reading and analyzing the data of the bar code 60.

The output example 90 of the combined image shows an example of printing after the image combining process. In the image combining utilizing the original sheet SH4, a first object image for combining and a second object image for combining are combined.

The "first object image for combining" is a photo image corresponding to the reference image 41 printed in the reference image area 40. Also the "second object image for combining" is an image obtained by integrally reading the print image 52 and the handwritten image 51 described in the handwriting area 50 as a single image.

Such two object images for combining are combined and printed to provide an output example 90 of the combined image.

The embodiment 6 allows, by a single combining process, to synthesize three images, namely the combination print image 52, the handwritten image 51 and the photo image PI corresponding to the reference image 41.

Figures 1, 11:
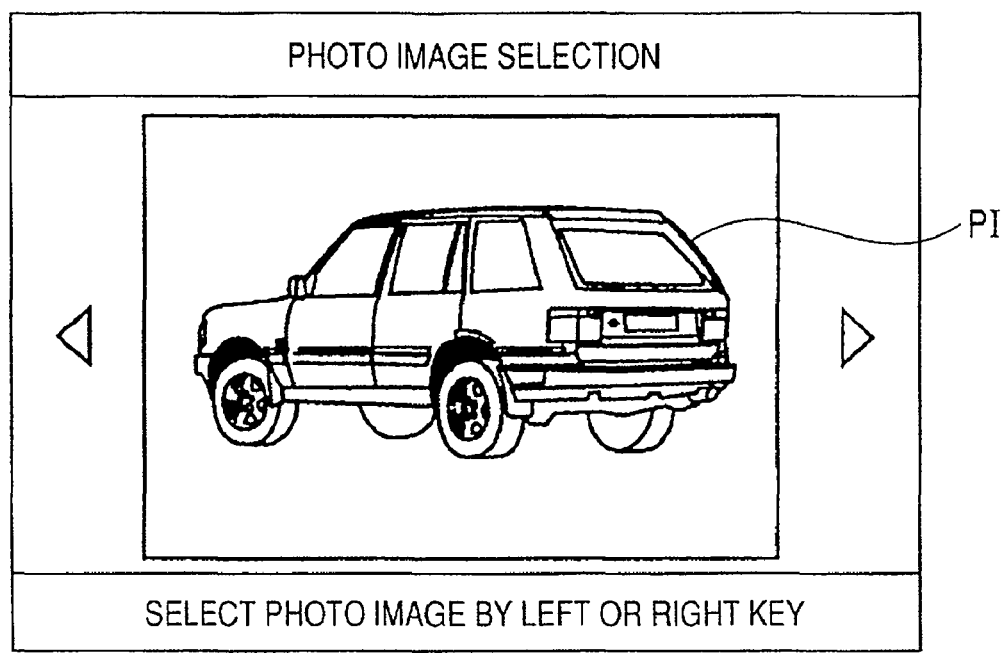
Figures 2, 11:
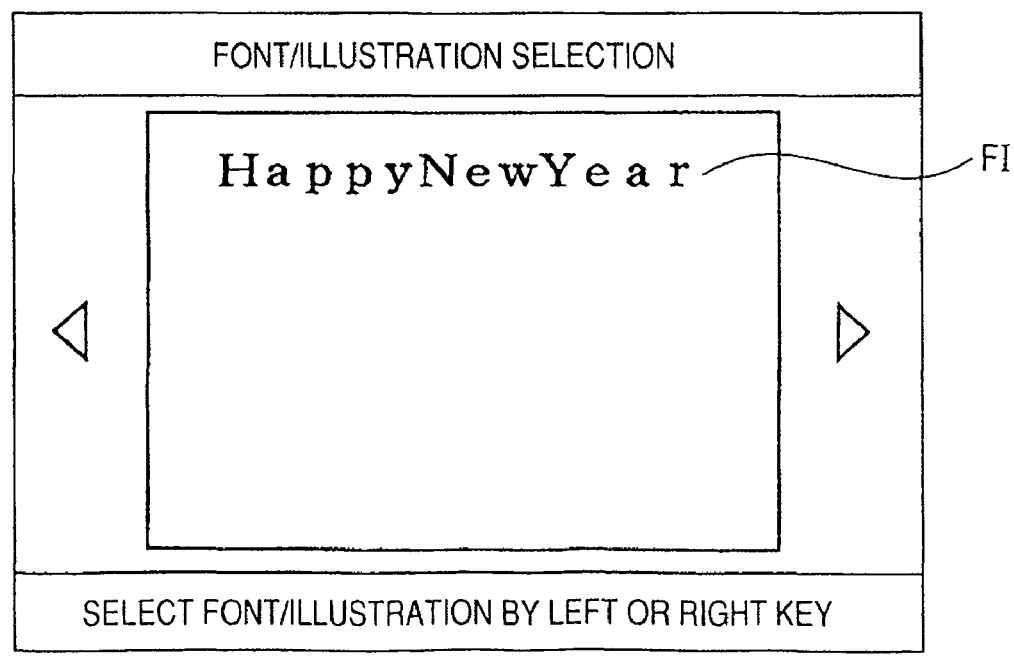

FIGS. 11-1 and 11-2 illustrate a process of selecting the photo image PI and font/illustration (combination print image 52), in order to print the original sheet SH4.

In printing the recording sheet SH4, the reference image 41 and the combination print image 52 are printed thereon. For this purpose, the reference image 41 and the combination print image 52 are selected prior to the printing of the original sheet SH4.

FIG. 11-1 shows a photo image selecting display screen 100 in the embodiment 6.

The photo image selecting display screen 100 is an example of the image displayed on the display portion 201 for selecting a photo image. The display portion 201 displays a photo image PI, which is a candidate to be used in image combining. A desired photo image PI is selected among plural photo images by operating minus/plus buttons 210, 211 provided on the operation panel 16, and is determined by the set key 212.

FIG. 11-2 shows a print image selecting display screen 110 in the embodiment 6.

The print image selecting display screen 110 is an example of the display screen displayed on the display portion 201, in order to select the combination print image (font/illustration FI) 52.

The font/illustration FI is a candidate of the font/illustration to be printed in the handwriting area 50 as the combination print image 52. A desired font/illustration FI is selected among plural font/illustrations by operating minus/plus buttons 210, 211 provided on the operation panel 16, and is determined by the set key 212.

Figure 12:
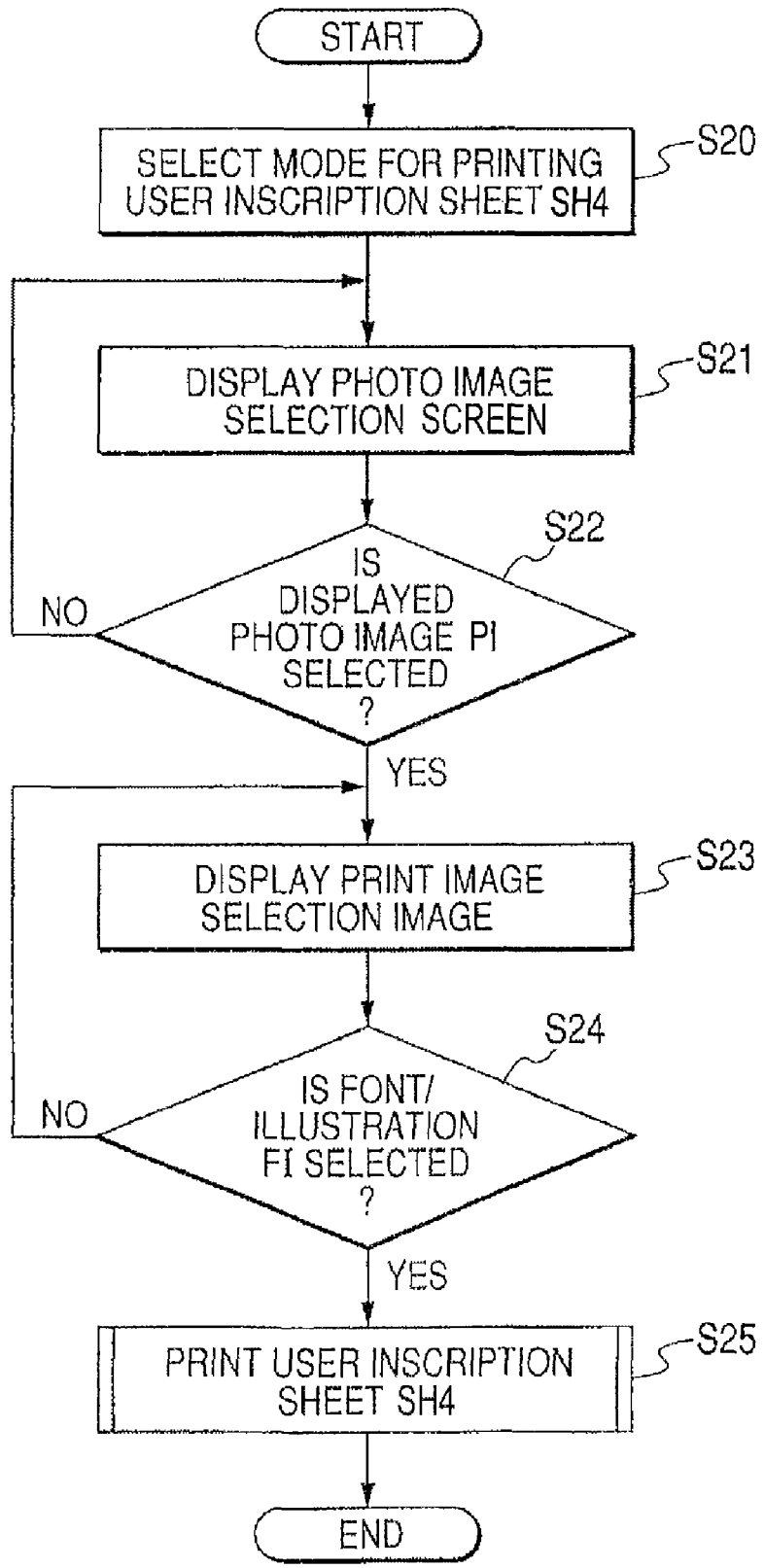
FIG. 12 is a flow chart showing a process, in the embodiment 6, of printing the original sheet SH4.

FIG. 12 is a flow chart showing operation in the embodiment 6 for printing the original sheet SH4.

In the embodiment 6, the operation panel 16 includes the print sheet key 208, which is used for executing the printing operation. Also the LCD 201 displays a photo image PI and a font/illustration FI.

At first a step S20 selects a printing of the original sheet SH4. In the embodiment 6, a mode of printing the original sheet SH4 can be selected by operating the print sheet key 208 in the operation panel 16 as shown in FIG. 9.

Then a step S21 displays, as shown in FIGS. 11-1, a photo image selecting display screen 100. More specifically, there is displayed a photo image PI stored in the memory card MC, connected to the LCD 201 of the operation panel 16.

Then, in a step S22, the user operates the minus/plus keys 210, 211 provided in the operation panel 16 to select a photo image PI, and then operates the set key 212 to determine the displayed photo image PI. On the other hand, in case the photo image is not yet selected, the step S21 continues to displays the photo image selecting image display screen 100.

Then a step S23 displays, as shown in FIGS. 11-2, a print image selecting display screen 110, namely a font/illustration FI.

A step S24 confirms whether the font/illustration FI has been selected. The selection of the font/illustration FI can be made, as in the step S22, by the minus/plus keys 210, 211 and the set key 212. In the case that the font/illustration FI is selected, the sequence proceeds to a step S25. In case the selection is not made, the step S23 continues to display the printed image selecting display screen 110, thus showing the font/illustration FI.

A step S25 prints the original sheet SH4. In this operation, the recording portion 113 prints the original sheet SH4, based on the photo image PI selected in S22 and the font/illustration FI selected in S24, and according to the user description data in a data storage portion 116 of the image processing apparatus 100.

Figure 13:
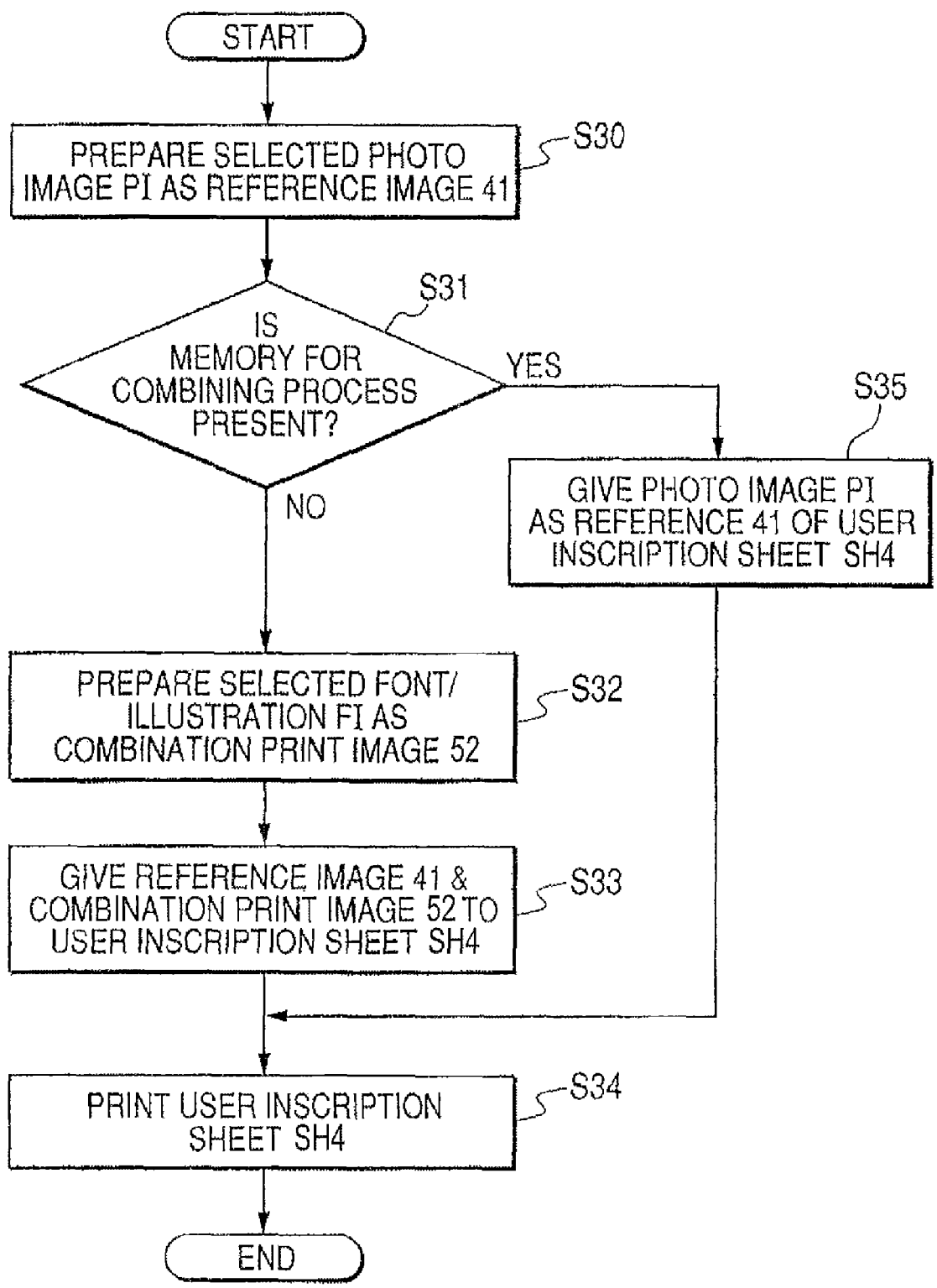
FIG. 13 is a flow chart showing operations, in the embodiment 6, of printing the original sheet SH4.

FIG. 13 is a flow chart showing a printing process of the original sheet SH4 in the embodiment 6.

At first a step S30 prepares an image, selected in, S21 as an image for the original sheet. In the embodiment 6, a photo image PI, selected by the user as a reference for the inscription by the user, in the original sheet SH4.

A step S31 confirms a memory capacity, in order to confirm whether the combining of the photo image PI and the font/illustration FI is possible. Then the sequence proceeds to S35 or S32, respectively according to whether the memory capacity, necessary for the image combining, is available or not. In case the memory capacity necessary for the image combining is not available, the font/illustration FI may be written in advance into the handwriting area 50, whereby, at the combining with the photo image PI later, the handwritten image 51 and the font/illustration FI can be processed as single image data.

Therefore, in the embodiment described above, the image combining process require only two memories for developing two sets of data.

A step S32 prepares an image of the font/illustration, selected in S23, for printing on the original sheet SH4.

A step S33 matches the images, prepared in S30 and S32, with the image of the original sheet SH4 to be actually printed.

A step S34 executes the printing of the original sheet SH4.

A step S35, utilizing the memory for image combining, matches the image prepared in S30 with the image of the original sheet SH4 to be actually printed.

A step S34 executes the printing of the original sheet SH4. In this operation, in the bar code 60 of the original sheet SH4, there is embedded information of the photo image to be combined, and, in case the font/illustration is selected in S23, there is embedded information indicating such selection.

In this manner, the original sheet SH4 can be printed with the photo image selected prior to the printing of the original sheet SH4 as explained in FIG. 12, and the printed image (image of font/illustration).

In the embodiment 6, the handwritten image 51, the photo image PI selected by the user and the combination print image 52 are printed in the original sheet SH4.

Figure 14:
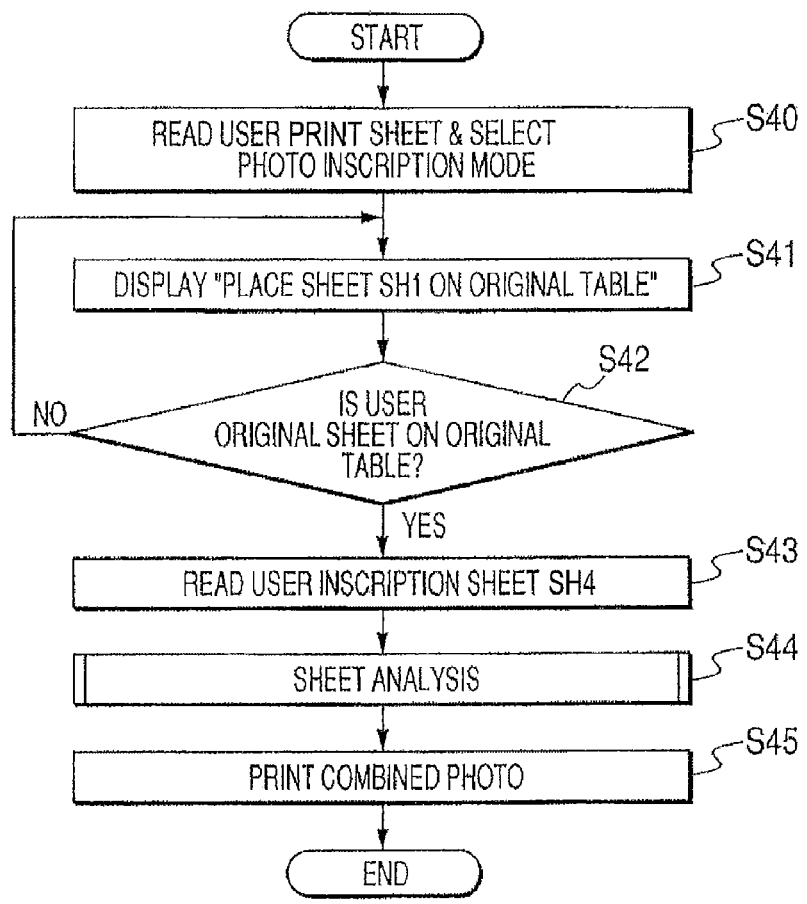
FIG. 14 is a flow chart showing a process, in the embodiment 6, of reading the printed original sheet SH4 and executing a combining process.

FIG. 14 is a flow chart showing an operation of the embodiment 6 for reading the printed original sheet SH4 and executing an image combining process.

Thus the operations shown in FIG. 14 are those for reading the printed original sheet SH4 by the reading portion 107 and combining thus read image and the photo image PI corresponding to the reference image 41.

This process is executed, after the printing of the original sheet SH4, for actually combining the photo image, selected in S22 in FIG. 12, and a content of combination desired by the user (image drawn in the handwriting area 50).

At first a step S40 selects a "mode for original sheet reading and photo printing" displayed on the operation panel 16. In the embodiment 6, such "mode for original sheet reading and photo printing" is selected by depressing the scan sheet mode 209.

A step S41 displays, on the display portion (LCD) 201 of the operation panel 16, a message requesting the user to place the original sheet SH4 on an original support of the reading portion 107.

A step S42 confirms that the original sheet SH4 is placed on the original support. Such confirmation may be executed by the image processing apparatus 100, or by a request to the user. When the original sheet SH4 is placed on the original support, the sequence proceeds to S43, but, in case the original sheet cannot be confirmed, S41 is executed again to display the message requesting the placement of the original sheet SH4.

A step S44 reads the original sheet SH4 placed on the original support of the reading portion 107. The data thus read are stored in the image memory 104 and are analyzed. Information of the combination print image 52 is thus obtained, by such analysis, from the original sheet SH4. The detailed process will be explained later with reference to FIG. 15.

A step S45 combines and prints the photo image PI selected in S22, the combination print image 52 and the handwritten image 51, read and analyzed in S44.

Figure 15:
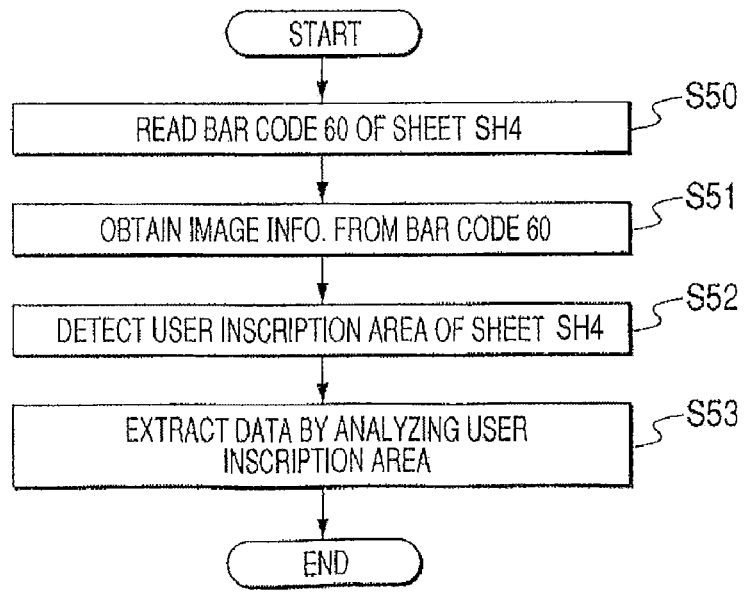
FIG. 15 is a flow chart showing a process, in the embodiment 6, of analyzing the original sheet SH4.

FIG. 15 is a flow chart showing operations of analyzing the original sheet SH4 in the embodiment 6.

A step S51 acquires image information from the information of the read bar code 60. The information of the selected photo image is incorporated, in S22, in the bar code 60. Thus the original sheet SH4 contains information indicating the photo image constituting the object of combining, and it is possible to avoid the trouble of selecting the photo image again, by merely reading the original sheet SH4.

Also in case S31 in FIG. 13 identifies that the memory required for the image combining is available, the process of printing the font/illustration image on the original sheet SH4 is not executed.

When the font/illustration FI selected in S23 is not printed in the handwriting area 50 of the original sheet SH4, information indicating the font/illustration FI of the object of image combining is incorporated in the bar code 60, and the step S51 also extracts such information.

A step S52 detects the position of the handwriting area 50 in the original sheet SH4.

A step S53 reads the combination print image 52 printed in the handwriting area 50 and the content (handwritten image) drawn by the user and extracts the analyzed data. In such extracting operation, there is also extracted a mark position in the setting area 30, positioned above the handwriting area 50.

Through such extracting operation, the printed data and the drawn data are handled as a single read image for image combining. S53 also extracts the information on print size, and the data of the combination print image 52, printed in the handwriting area 50 of the original sheet SH4, and the data of the handwritten image 51 drawn by the user can be handled as a single set of data, whereby a pseudo image synthesis is thus achieved.

In the embodiment 6, in printing the original sheet SH4, the reference image 41 corresponding to the photo image PI to be combined is printed in advance on the original sheet SH4, and then, in reading the original sheet SH4, the handwritten image 51 drawn by the user and the combination print image 52 are read and discriminated as same combining data and synthesized with the photo image PI. Therefore, at the image combining operation, the combination print image 52 and the handwritten image drawn by the user are processed as a single image, and a combining process of the combination print image 52 and the handwritten image 51 can be dispensed with.

Embodiment 7

In an embodiment 7 of the present invention, the reference image 41 used as an index printing is not printed on the original sheet SH4.

Figures 1, 16:
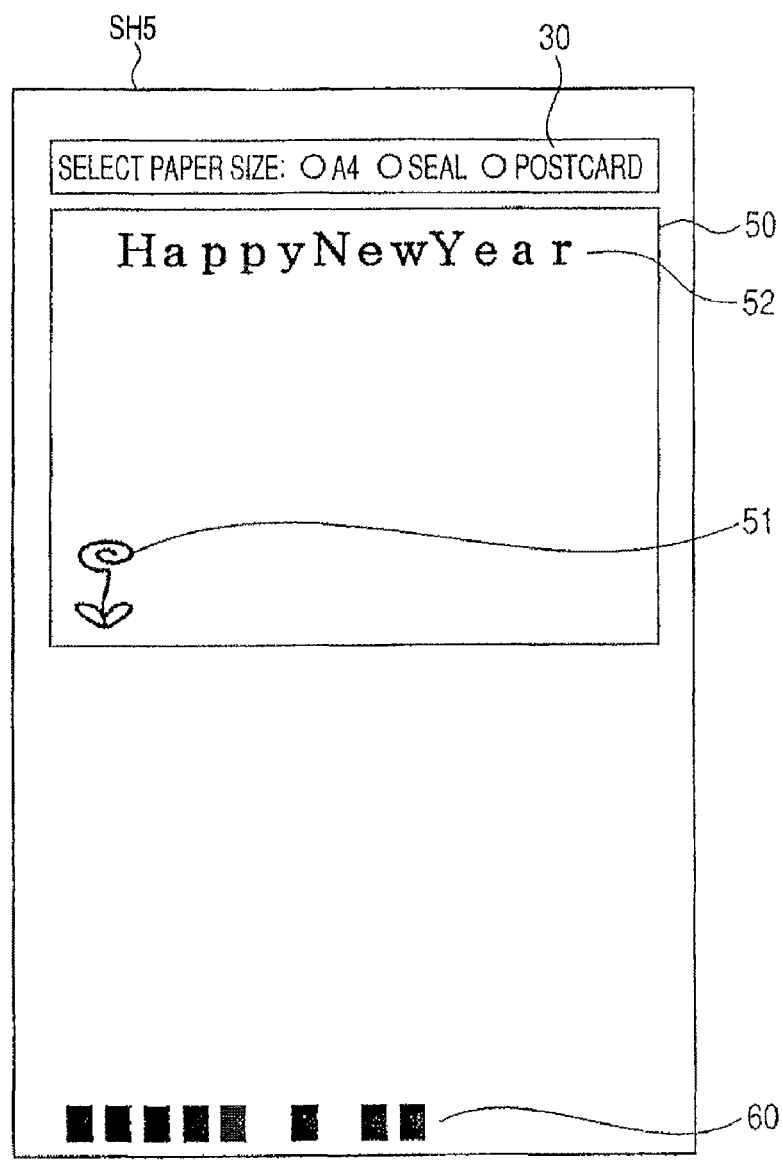
Figures 2, 16:

FIGS. 16-1 and 16-2 show original sheets SH5 of the embodiment 7.

The operation panel 16 shown in FIG. 9 and the photo image selecting display screen and the combining print image selecting display screen shown in FIG. 11-1 are used in the same manner also in the embodiment 7.

The original sheet SH5 includes a setting area 30, a handwriting area 50 and a bar code 60.

In the embodiment 7, as the reference image 41, printed in the embodiment 6, is not printed on the original sheet SH5, it is possible to reduce the ink consumption in printing the original sheet SH5.

The original sheet SH5, not containing the reference image as an index, is printed through the operation panel 16 of the image processing apparatus 100.

In the image processing apparatus 100, the operation panel 16 executes a setting for printing the original sheet SH5, and the recording portion 113 executes the printing of the original sheet SH5. The thus printed original sheet SH5 contains the handwriting area 50 for drawing a handwritten image to be combined, then the handwriting area 50 of the original sheet SH5 is read by the reading portion 107 and is combined with the photo image PI corresponding to the reference image 41, and a result of such combining is printed by the recording portion 113 to achieve an image combining.

In the embodiment 7, the print sheet key 208 is used for printing the original sheet SH5. The details of the printing of the original sheet SH5 are shown in FIG. 12, and those of the operation for reading the original sheet SH5 for image combining are shown in FIG. 13.

The setting area 30 is used for designating the size of a sheet for printing the combined image.

In the embodiment 7, the setting area 30 is formed as a marking sheet, with printed marks corresponding to different sheet sizes. When the reading portion 107 reads the original sheet SH5 for image combining, it also reads the setting area 30 and determines the output size of the combined image according to the marked size.

The handwriting area 50 is used for inscribing a content to be combined. An inscription is made in the handwriting area 50, and, when the reading portion 107 reads the original sheet SH5 at the image combining operation, a content inscribed in the handwriting area 50 is taken as a content for image combination. In the embodiment 7, at the image combining operation, a white background is disregarded, and a handwritten image 51 drawn by the user for example by a pen and a printed combining image 52 are regarded as a content of image combination and are used for the image combining operation.

The combination print image 52 is an image of a font/illustration selected by the user at the printing of the original sheet SH5. The data for such image are present in the image processing apparatus 100 for printing the original sheet SH5, and, at the printing of the original sheet SH5, are printed in the handwriting area 50 of the original sheet SH5.

The handwritten image 51 is an example of the content inscribed by the user on the original sheet SH5. The handwritten image 51 is not yet recorded when the original sheet SH5 is printed.

In the image combining process utilizing the original sheet SH5, the handwriting area 50 is read, and the combination print image 52 and the handwritten image 51 are read as a single object for image combining.

In the bar code 60, embedded is information of the photo image PI selected for image combining and the combination print image 52. Such data are read and analyzed to extract the image information.

The embodiment 7 utilizes a single combining operation, which combines three objects, namely the combination print image 52, the handwritten image 51 and the photo image PI.

In the following, there will be explained the operations of printing the original sheet SH5.

Figure 17:
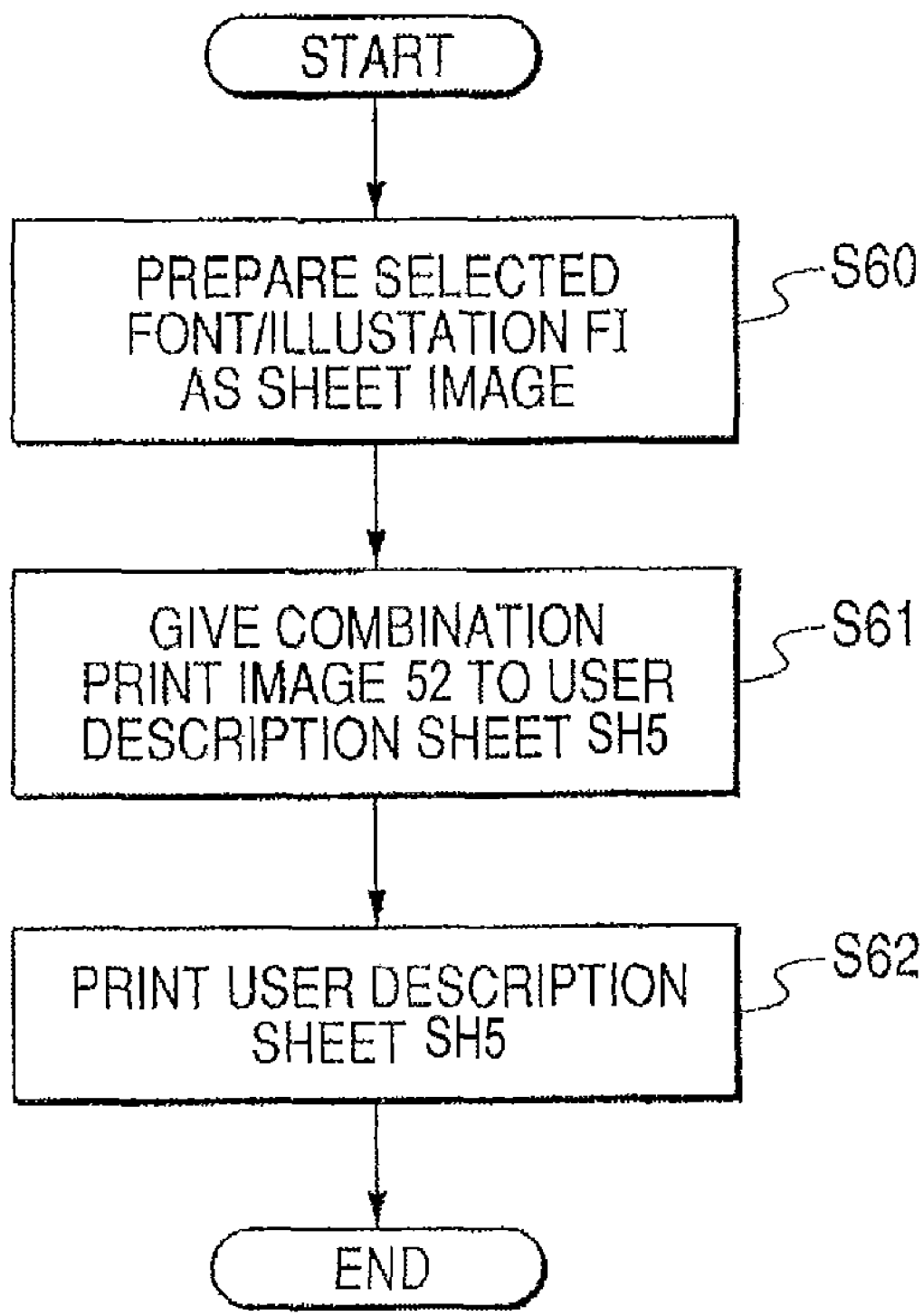
FIG. 17 is a flow chart showing a process, in the embodiment 7, of printing the original sheet SH5.

FIG. 17 is a flow chart showing a printing process of the original sheet SH5 in the embodiment 7.

At first a step S60 prepares an image of the font/illustration, selected in S23, for printing on the original sheet SH5.

A step S61 matches the font/illustration FI, prepared in S60, with the combination print image 52 of the original sheet SH5 to be actually printed.

A step S62 executes the printing of the original sheet SH5.

In this manner, the combination print image 52 is printed on the original sheet SH5, then the user draws the handwritten image 51 on the original sheet SH5, whereby the images 51, 52 are coupled (inscribed in a same area) but are not subjected to an image combining.

In reading the original sheet SH5, the combination print image 52 and the handwritten image 51 drawn by the user are read and combined, as a single object for combining, with the photo image PI.

In the embodiment 7, the combination print image 52 and the handwritten image 51 are used as a single object of image combining, without an image synthesis, and the number of combining operations can be reduced in comparison with a case where the combination print image 52 and the handwritten image 51 are combined and the result of such combining is combined with the photo image PI.

Embodiment 8

In an embodiment 8 of the present invention, a font/illustration image FI is printed also on the reference image 41 on the original sheet SH6.

The operation panel 16 shown in FIG. 9 and the photo image selecting display screen and the combination print image selecting display screen shown in FIG. 11-1 are used in the same manner also in the embodiment 8.

Figures 1, 18:
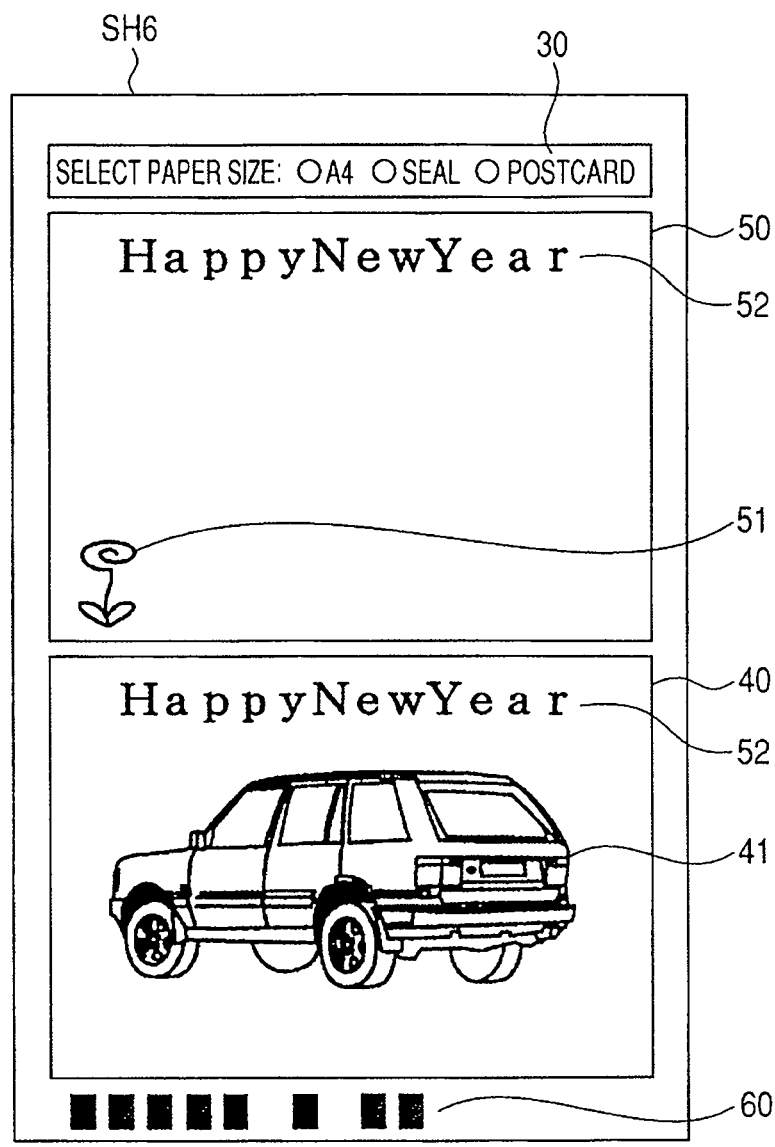
Figures 2, 18:
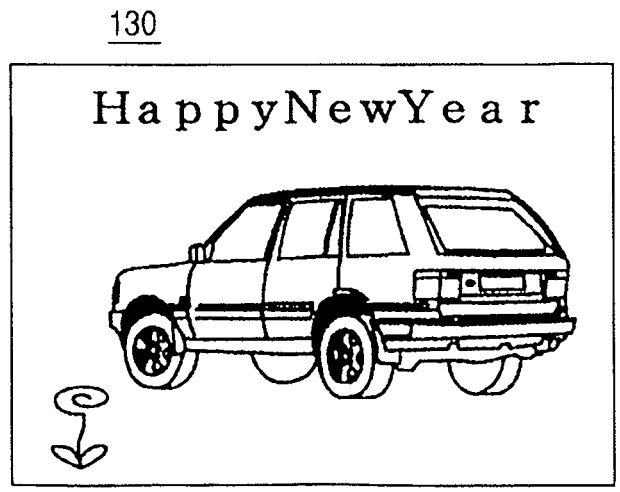

FIGS. 18-1 and 18-2 show original sheets SH6 of the embodiment 8, in which a combining image 52, corresponding to the font/illustration FI, is printed in the reference image 41.

In the embodiment 8, the original sheet SH6 is utilized to combine the photo image, stored in the memory card MC connected to the USB host control portion 117, and a content inscribed in the original sheet SH6.

More specifically, at first a setting for printing the original sheet SH6 is executed in the operation panel 16, and the recording portion 113 prints the original sheet SH6. The printed original sheet SH6 contains the handwriting area 50 for inscribing a content to be combined, then the reading portion 107 reads such handwriting area 50 for synthesis with a photo image PI corresponding to the reference image 41, and the result of such synthesis is printed by the recording portion 113 to obtain a combined print example 130 as shown in FIGS. 18-2.

In the embodiment 8, the print sheet key 208 is used for printing the recording sheet SH6.

Details of the printing operation of the original sheet SH6 are same as those shown in FIG. 12, and those of the operations for reading the original sheet SH6 and executing the image combining are same as those shown in FIG. 13.

The setting area 30 is used for designating the size of printing of the combined image, and is formed as a marking sheet, with printed marks corresponding to different sizes. When the reading portion 107 reads the original sheet SH6 for image combining, it also reads the setting area 30 and determines the output size of the combined image according to the marked size.

The handwriting area 50 is used for inscribing a content to be combined (combination print image 52 and handwritten image 51). An inscription is made in the handwriting area 50, and, when the reading portion 107 reads the original sheet SH6 at the image combining operation, a content inscribed in the handwriting area 50 is taken as a content for image combination.

At the image combining operation, a white background is disregarded, and a handwritten image 51 drawn by the user for example by a pen and a combination print image 52 are regarded as a content of image combination and are used for the image combining operation.

The reference image 41 is an image corresponding to the photo image PI. In printing the original sheet SH6, a combination print image 52, to be printed in the handwriting area 50, and a photo image PI, corresponding to the reference image 41 to be printed in the reference image area 40, are combined. The reference image 41 is a sample indicating the photo image PI constituting the object of combining, for the drawing of the handwritten image 51 by the user in the handwriting area 50, and, in the actual combining operation, the data of the photo image PI are not extracted from the original sheet SH6 but from the bar code 60.

The handwriting area 50 and the reference image area 40 have mutually same sizes, so that the user can judge an actual size at the inscription in the handwriting area 50.

The combination print image 52 is an image of a font/illustration selected by the user at the printing of the original sheet SH6. The data for such image are present in the image processing apparatus 100 for printing the original sheet SH6, and, at the printing of the original sheet SH6, are printed in such a manner that the image 52 for combination is printed within the handwriting area 50.

The handwritten image 51 is an example of the content inscribed by the user on the original sheet SH6. The handwritten image 51 is not yet recorded when the original sheet SH6 is printed.

In the image combining process utilizing the original sheet SH6, the handwriting area 50 is read, and the combination print image 52 and the handwritten image 51 are read as a single object for image combining, which is then synthesized with the photo image PI, corresponding to the reference image 41 printed in the reference image area 40.

The bar code 60 is information embedded in the original sheet SH6. In the embodiment 8, embedded is the information of the photo image PI, selected as the object of combining. Such data are read and analyzed to extract the image information.

The font/illustration FI is combined with the photo image PI, and the combination print image 52 and the reference image 41 are printed. As the reference image area 40 prints the reference image 41 and the combination print image 52, the user can know in advance, when inscribing the handwritten image 51 in the handwriting area 50, a state after the combination print image 52 and the reference image 41 are combined.

The example of combined printing 130 shows an example of printing. In a combining operation utilizing the original sheet SH6, the handwritten image 51 and the combination print image 52 in the handwriting area 50 are used as an object of image combining, and are subjected to a combining process with original data of the image printed in the reference image area 40, whereby a combined image 130 can be printed in the reference image area 40 as shown in FIGS. 18-2.

In the following, there will be explained operations of printing the original sheet SH6 in the embodiment 8.

Figure 19:
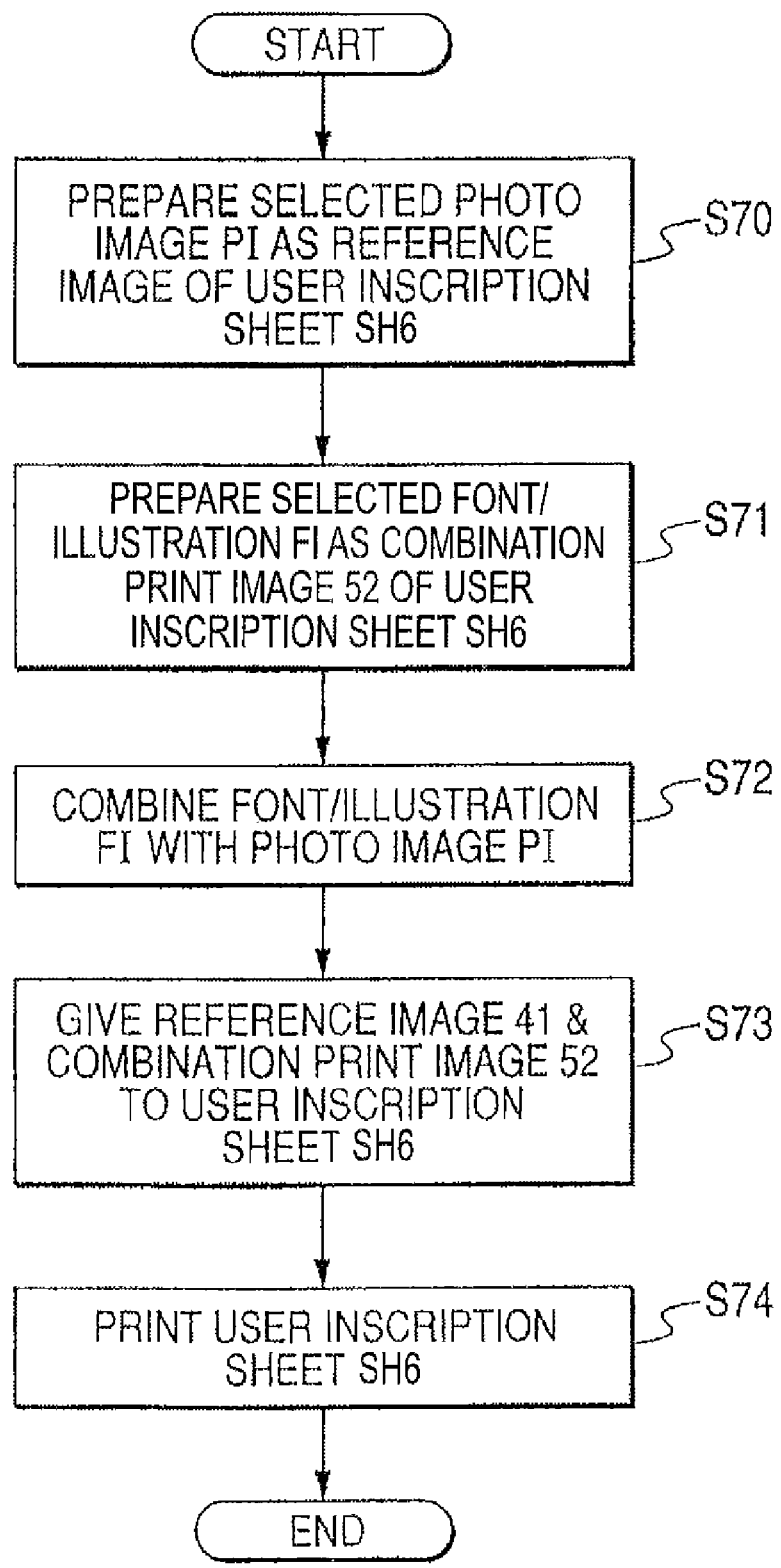
FIG. 19 is a flow chart showing a process, in the embodiment 8, of printing the original sheet SH6.

FIG. 19 is a flow chart showing a printing process of the original sheet SH6 in the embodiment 8.

At first a step S70 prepares a photo image PI, selected in S22, as a reference image 41 for the original sheet SH6. In the embodiment 8, a reference image 41 corresponding to the photo image PI, selected by the user, is printed in the original sheet SH6.

A step S71 prepares an image of the font/illustration FI, selected in S23, as a combination print image 52 for the original sheet SH6.

A step S72 combines the font/illustration FI prepared in S71, with the photo image PI prepared in S70. Such combined image (reference image 41 and combination print image 52) is used as a reference index of the original sheet SH6.

A step S73 matches the images, prepared in S72, with the original sheet SH6 to be actually printed.

A step S74 executes the printing of the original sheet SH6.

In this manner, the original sheet SH6 can be printed with the reference image 41 corresponding to the photo image PI selected prior to the printing of the original sheet SH6 as explained in FIG. 12, and the combination print image 52 corresponding to the font/illustration FI.

In the embodiment described above, at the printing of the original sheet SH6 for inputting a handwritten information of the user for image combining operation, an image to be combined is printed in advance on the original sheet SH6, and, in reading the original sheet SH6, the handwritten image 51 drawn by the user and the combination print image 52 are read as a single object of combining, and such read image is combined with the photo image PI. Therefore, in such embodiment, a process of synthesizing the printed combining image 52 and the handwritten image 51 is not required in the image combining operation, thereby allowing to reduce the number of image combining operations.

The embodiments 6, 7 and 8 are different in whether the user prints the font/illustration FI as a reference index in the reference image area 40 of the original sheet, but all these embodiments are effective regardless whether such reference index is printed or not.

The foregoing embodiments can also be understood as inventions of a program. Stated differently, the foregoing embodiments constitute examples of a program which causes an image processing apparatus to execute a photo image selecting step of selecting a desired photo image from plural photo images stored in photo image storage means, a font/illustration selecting step of selecting a desired font/illustration from plural font/illustrations, and an original sheet preparing step of printing a reference image, corresponding to the selected photo image, in a reference image area, also printing an image for combining corresponding to the selected font/illustration in a handwriting area, in such a manner that the reference image area and the handwriting area are mutually adjacent, thereby preparing an original sheet.

Also the foregoing embodiments constitute examples of a program which causes an image processing apparatus to execute a photo image selecting step of selecting a desired photo image from plural photo images stored in photo image storage means, a font/illustration selecting step of selecting a desired font/illustration from plural font/illustrations, an original sheet preparing step of printing a combining image, corresponding to the selected font/illustration in a handwriting area, a read step of reading the handwritten image inscribed in the handwriting area and the combination print image, and a combining step of combining the combination print image and the handwritten image, which are read in the reading step, and a photo image corresponding to the reference image.

The present invention provides an effect allowing to draw a handwritten original, at the time of such drawing on a sheet, while confirming the positional relationship how the handwritten original is combined with the photo image as the object of image combining.

The present invention also provides an effect of not requiring a large burden on resources necessary for image combining nor a long process time, even with a large amount of data to be combined such as photo image data, data written by a user, a photo frame and the like.

This application claims priority from Japanese Patent Application Nos. 2005-179627 filed Jun. 20, 2005 and 2005-185261 filed Jun. 24, 2005, which are hereby incorporated by reference herein.

What is claimed is:

1. An image processing apparatus including at least a processor for executing a plurality of control program units, the apparatus comprising:
   a selection unit, executed by the processor, configured to select a first image from plural images stored in a memory;
   a first print control unit, executed by the processor, configured to cause a printing apparatus to print, on a sheet, a sheet image including the first image selected by the selecting unit, information for specifying a size of a print medium selected by a user, and an area designated for the user to add an added image;
   an acquiring unit, executed by the processor, configured to acquire the added image which has been added by the user in the area designated on the sheet printed by the first print control unit, and a second image including the information, from the sheet, which is read by a reading apparatus;
   a determining unit, executed by the processor, configured to determine a selected size of a print medium selected by the user, based on the information included in the second image acquired by the acquiring unit;
   a processing unit, executed by the processor, configured to process both the first image retrieved from the memory and the added image acquired by the acquiring unit according to the selected size of the print medium determined by the determining unit, so that the size of both the first image from the memory and a combining image corresponding to the area designated on the sheet, including the added image, are fitted to the selected size of the print medium; and
   a second print control unit, executed by the processor, configured to cause the printing apparatus to print a third image, which is generated by combining the first image retrieved from the memory and the added image, as processed by the processing unit, on the selected size of the print medium.

2. An image processing apparatus according to claim 1, wherein the first print control unit causes the printing apparatus to print the sheet to include scale lines which divide the first image.

3. An image processing apparatus according to claim 1, further comprising an extracting unit configured to extract the combining image corresponding to the area designated on the sheet, including the added image, wherein the first print control unit causes the printing apparatus to print, on the sheet, the sheet image including an indication of the area to be extracted by the extracting unit, and the second print control unit causes the printing apparatus to print the third image which is generated by combining the first image and the added image included in the combining image extracted by the extracting unit.

4. An image processing apparatus according to claim 3, wherein the first print control unit causes the printing apparatus to print, on the sheet, the sheet image including a reference area in which the first image is printed, the reference image area being substantially the same size as the indication of an area to be extracted by the extracting unit.

5. An image processing apparatus according to claim 1, wherein the first print control unit causes the printing apparatus to print the first image with a lowered print density.

6. An image processing apparatus according to claim 1, wherein the first print control unit causes the printing apparatus to print information for specifying the first image selected from plural images stored in the memory by the selection unit, and the second print control unit retrieves the first image from the memory, according to the information included in the image which is obtained by reading of the sheet by a reading apparatus.

7. An image processing method comprising:
   selecting a first image from plural images stored in a memory;
   causing a printing apparatus to print, on a sheet, a sheet image including the selected first image retrieved from the memory, information for specifying a size of a print medium to be selected by a user, and an area designated for the user to add an added image;
   acquiring the added image which has been added by the user in the area designated on the sheet and a second image including the information from the sheet, which is read by a reading apparatus;
   determining a selected size of a print medium selected by the user, based on the information included in the acquired second image;
   processing both the first image retrieved from the memory and the added image acquired by the acquiring unit according to the selected size of the print medium determined by the determining step, so that the size of both the first image from the memory and a combining image corresponding to the area designated on the sheet, including the added image, are fitted to the selected size of the print medium; and
   causing the printing apparatus to print a third image, which is generated by combining the first image retrieved from the memory and the added image, as processed by the processing unit, on the selected size of the print medium.

8. An image processing apparatus including at least a processor for executing a plurality of control program units, the apparatus comprising:
   a first selection unit, executed by the processor, configured to select a first image from plural images stored in a memory;
   a second selection unit, executed by the processor, configured to select a second image from plural images stored in a memory;
   a print control unit, executed by the processor, configured to cause a print apparatus to print, on a sheet, a sheet image including both of the first image selected by the first selection unit and the second image selected by the second selection unit;
   an acquiring unit, executed by the processor, configured to acquire a third image which is obtained by reading of the sheet on which the first image and the second image have been printed by the print control unit and on which an added image has been added by a user in a designated area, by a reading apparatus, wherein the third image includes, as one image, both of the second image and the added image which has been added on the sheet by the user in the designated area; and
   a combining unit, executed by the processor, configured to combine the first image retrieved from the memory and the third image acquired by the acquiring unit, without using the first image which has been printed on the sheet.

9. An image processing apparatus according to claim 8, wherein the print control unit causes the printing apparatus to print on the sheet an indication of an area, including the second image, to be extracted by the acquiring unit, and the acquiring unit extracts the third image corresponding to the area, including the second image and the added image, indicated in the sheet printed by the print control unit, from an image of the sheet which is read by the reading apparatus.

10. An image processing apparatus according to claim 8, wherein the second image is a font or an illustration.

11. An image processing apparatus according to claim 8, wherein the memory which stores plural images for the first selection unit to select the first image is an external image storage medium.

12. An image processing apparatus according to claim 8, wherein the memory which stores plural images for the second selection unit to select the second image is an external image storage medium.

13. An image processing apparatus according to claim 8, further comprising an image storage medium storing plural images, wherein the second image is stored in the image storage medium.

14. An image processing apparatus according to claim 8, wherein the print control unit causes the printing apparatus to print information for specifying the first image selected from plural images stored in the memory by the first selection unit, and the combining unit retrieves the first image from the memory, according to the information included in the image which is obtained by reading of the sheet by a reading apparatus.

15. A control method for an image processing apparatus comprising:
   selecting a first image from plural images stored in a memory;
   selecting a second image from plural images stored in the memory;
   causing a print apparatus to print both of the first image and the second image on a sheet;
   acquiring an third image which is obtained by reading of the sheet on which the first image and the second image have been printed and an added image has been added in a designated area on the sheet by a user, by a reading apparatus, the third image including, as one image, both the second image and the added image which has been which is added in the designated area on the sheet by the user; and
   combining the first image retrieved from the memory and the third image acquired by the acquiring step, without using the first image which has been printed on the sheet.

* * * * *